United States Patent [19]

Crosbie et al.

[11] Patent Number: 5,021,982
[45] Date of Patent: Jun. 4, 1991

[54] MOTION BASE CONTROL PROCESS AND PILOT PERCEPTUAL SIMULATOR

[75] Inventors: Richard J. Crosbie, Langhorne; Joseph Colombo, Newtown, both of Pa.

[73] Assignee: Veda Incorporated, Warminster, Pa.

[21] Appl. No.: 291,290

[22] Filed: Dec. 28, 1988

[51] Int. Cl.⁵ .............................................. G09B 9/08
[52] U.S. Cl. .................... 364/578; 434/55; 434/59
[58] Field of Search .................. 364/578; 434/30, 35, 434/37, 45, 46, 51, 55, 59

[56] References Cited

U.S. PATENT DOCUMENTS

| | | | |
|---|---|---|---|
| 2,687,580 | 8/1954 | Dehmel | 434/55 |
| 4,207,688 | 6/1980 | Derderian et al. | 434/43 |
| 4,236,325 | 12/1980 | Hall et al. | 434/45 |
| 4,244,120 | 1/1981 | Harris | 434/59 |
| 4,280,285 | 7/1981 | Haas | 434/30 |
| 4,710,128 | 12/1987 | Wachsmuth et al. | 434/46 |
| 4,710,129 | 12/1987 | Newman et al. | 434/55 |
| 4,751,662 | 6/1988 | Crosbie | 364/578 |

OTHER PUBLICATIONS

Crosbie, R. J., "Application of Experimentally Derived Pilot Perceptual Angular Response Transfer Functions", AIAA Flight Simulators Tech. Conf. and Tech. Display, 6/13-15/83, Niagra Falls, N.Y.
Crosbie, R. J., "Explicit Expressions for the Angular . . .", NADC-MA-6034, Oct. 17, 1960.
"Dynamic Flight Simulator Centrifuge Configuration . . .", Veda Rpt. No. 34753-87U/P3511-002, NADC, 12/28/87.
Crosbie, R. J. et al., "Controlling the Human Centrifuge as Force and Motion Platform for the Dynamic Flight Simulator", AIAA Flight Simulation Technologies Conf., 7/22-24/85, St. Louis, Mo.
"Final Technical Report Study/Services Contract Centrifuge Control System Analysis", Veda Rpt. No. 34753-87U/P3512-004, NADC, 04/30/88.
"Centrifuge Control Algorithm Enhancement Analysis: Low-G Provision", Veda Rpt. No. 33514-88U/P3511-002, NADC, 05/12/88.

*Primary Examiner*—Thomas G. Black
*Attorney, Agent, or Firm*—Finnegan, Henderson, Farabow, Garrett & Dunner

[57] ABSTRACT

A process for controlling a gimballed motion base system substantially duplicating pilot perceptions in a simulated aircraft. The process includes: a subprocess accounting for an effect of yaw on a motion base arm, a full-G bias function and a limited-G bias function, a low-G bias function, improved computation of pitch and roll gimbal commands to negate artifacts, a negative-G algorithm, allowing various yaw gimbal positions, allowing various cockpit orientations, and a yaw gimbal control process.

A perceptual model based on emperically observed human response data predicts perceived pitch, roll, and yaw, and accounts for the fact that a Gy component of linear acceleration affects both roll and yaw perception.

59 Claims, 15 Drawing Sheets

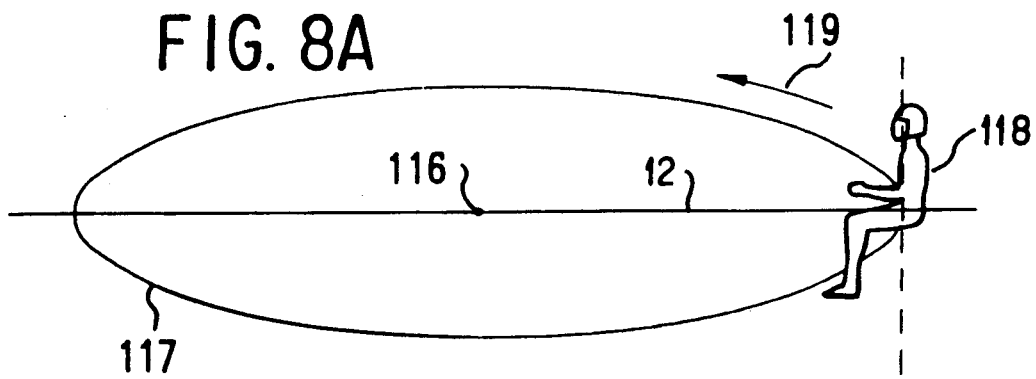
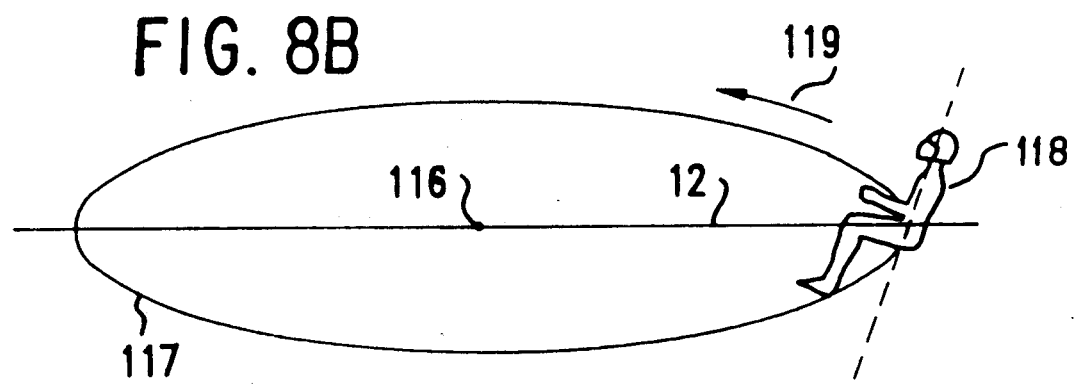
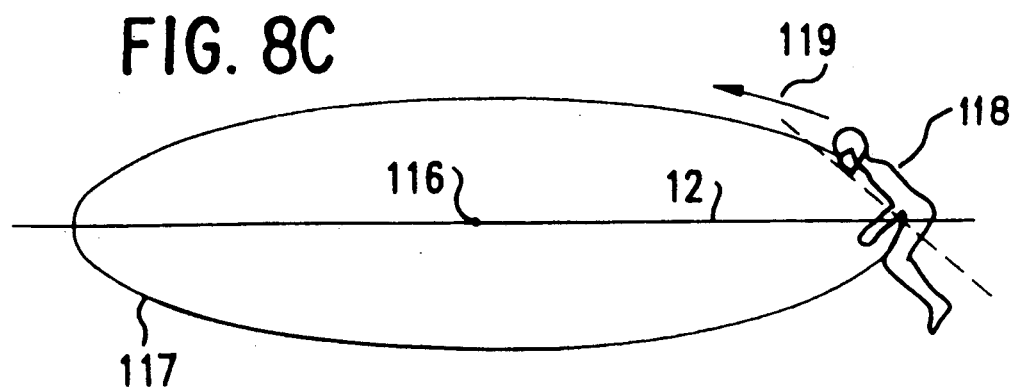

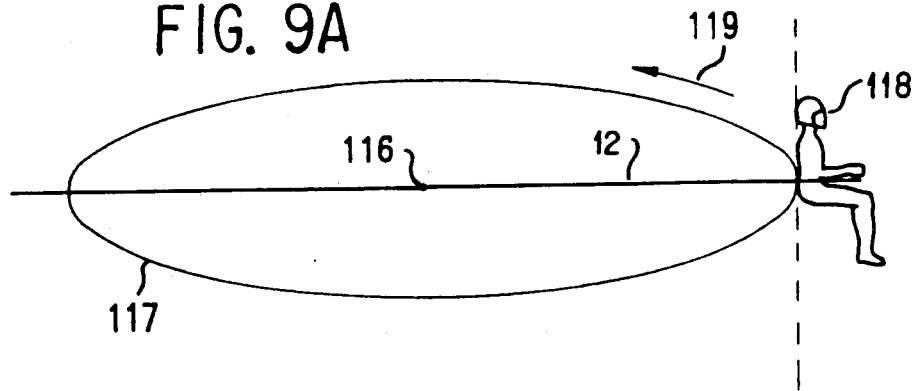
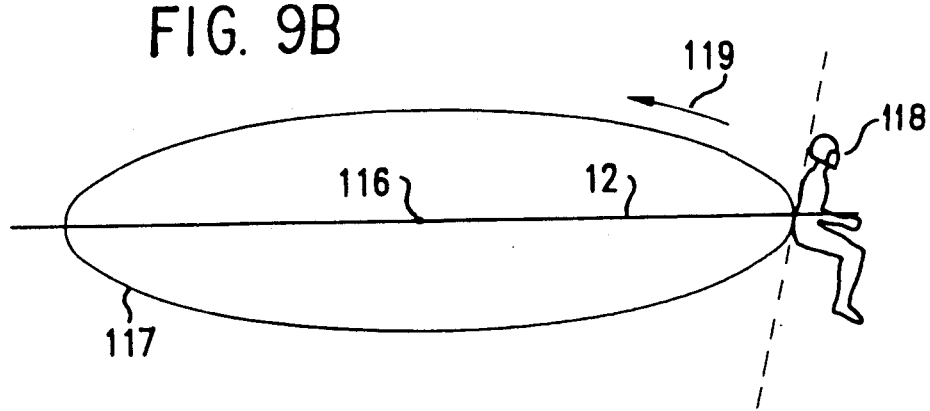
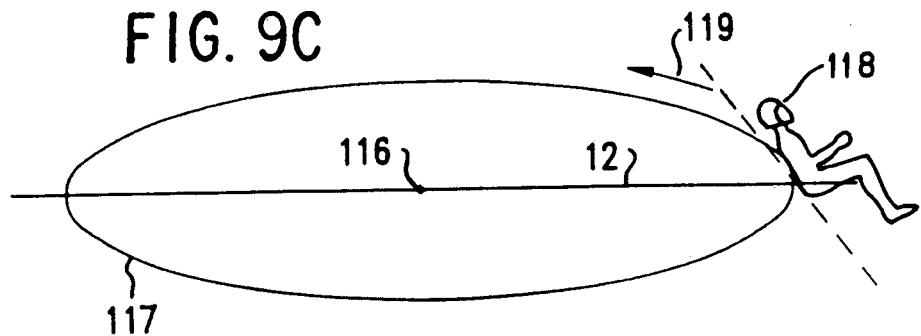

MOTION BASE CONTROL PROCESS AND PILOT PERCEPTUAL SIMULATOR

BACKGROUND OF THE INVENTION

The present invention relates to gimballed motion base systems used for familiarizing pilots with the force and motion environment associated with actual flight of modern high performance aircraft, and more particularly to a control system for a motion base system for enhancing flight realism for the occupant with regard to his perception and response to the linear and angular motions generated by the motion base system.

A. Visual, Physiological, and Proprioceptive Perceptions in a Human Pilot

A ground-based motion based system provides a safe and convenient research facility for test and evaluation of new concepts and crew station design, cockpit displays and controls, restraint systems, aerodynamic configurations, and handling qualities as well as conducting training in pilot procedures in the acceleration or G-environment in which they are design to be used. The invention is also useful in the development of air frames, crew stations, crew protective mechanisms and techniques.

Throughout this document, the "roll axis" of an aircraft is taken to mean the horizontal axis running between the nose and tail of the aircraft, as shown in FIG. 16A. The "pitch axis" of the aircraft is taken to mean the horizontal axis bisecting the plane through both wings, as shown in FIG. 16B. The "yaw axis" is taken to mean the vertical axis running through the intersection of the pitch and roll axes, as shown in FIG. 16C.

U.S. Pat. No. 4,751,662 to Richard J. Crosbie (hereinafter referred to as the '662 patent, which is herein incorporated by reference, discloses a motion base control system. FIG. 1 is a figure from the '662 patent showing a closed-loop human sensing system for an aircraft pilot controlling an aircraft 10 in flight through manually operated controls 11. In addition to feedback through the feel of the control stick and foot pedals, the pilot senses the angular motion and linear force stimuli through his visual, proprioceptive, and physiological receptors. The visual receptors sense the angular motion, including position, rate, and acceleration of the aircraft, as seen by the pilot through the aircraft canopy and the instrument displays within the cockpit. The physiological receptors sense the linear acceleration forces imparted to various parts of the pilot's body. The proprioceptive receptors sense the angular motion of the pilot as perceived through his tactile/kinesthetic and vestibular receptors. Angular motion stimulation for these proprioceptive receptors can be separated into two components: angular acceleration and rotating linear acceleration vectors. Thus, the visual receptors receive their stimuli from the angular motions of the aircraft, the physiological receptors from the linear forces of the aircraft, and the proprioceptors from both the angular motion and linear acceleration vectors. Measurements made of human perceptual responses to separate and combined oscillatory stimuli of angular acceleration and rotating linear acceleration vectors about the roll and pitch axes reveal that, when the mean phase angle shifts of the perceived responses for each component stimulus are taken into account, the perceived response to the combined stimuli can be predicted from the scaled sum of the responses.

FIGS. 2A, 2B, and 2C illustrate the three different ways the angular acceleration and rotating linear acceleration vectors combine to create the pilot's perception of angular rotation $\phi_a$ about the aircraft roll axis. In pure vector rotation $\phi_{va}$, (FIG. 2A), where the pilot is stationary while the vector rotates, the vestibular otolith organs along with tactile/kinesthetic receptors are stimulated by the rotating linear acceleration vector G. In pure angular rotation $\phi_{aa}$, (FIG. 2B), where the vector and pilot both rotate through the same angle, the vestibular semicircular canals are stimulated by the angular accelerations. In combined angular and vector rotations $\phi_{va}+\phi_{aa}$ (FIG. 2C), where the vector is stationary while the pilot rotates, the otolith and semicircular canals are both stimulated, together with the tactile/kinesthetic receptors. Consequently, by controlling the roll and pitch gimbal drive signals to create rotating linear acceleration vectors in a timely fashion with respect to pure angular rotations, more accurate angular perception can be achieved.

B. Hardware for a Motion Base System

FIG. 3 shows a two-gimbal system similar to the system controlled by the '662 patent. An aircraft cockpit (not shown) is mounted at the end of an arm 12 of radius r, e.g., 50 feet, rotating at an angular velocity $\omega_c$. The gimbal system includes an outer A gimbal 13 rotating through an angle $\phi_c$ about a horizontal axis perpendicular to arm 12, and an inner B gimbal 14, rotating through an angle $\theta_c$ about an axis in the plane of outer A gimbal 13 and perpendicular to its axis. The A and B gimbals are controlled by motors (not shown).

The angles $\phi_c$ and $\theta_c$, along with the angular velocity $\omega_c$ of the arm 12 constitute three independent, controllable functions used in controlling the motion base system, and manifest the orthogonal components $G_{rc}$, $G_{tc}$, and $G_{vc}$ for radial, tangential, and vertical accelerations, respectively. They are related to the transverse, lateral, and longitudinal acceleration components $G_{xc}$, $G_{yc}$, and $G_{zc}$, and the roll, pitch, and yaw angular velocities $p_c$, $q_c$, and $r_c$ experienced by motion base pilots through the following equations:

$$G_{xc} = G_{tc}\cos\theta_c - G_{rc}\sin\phi_c\sin\theta_c + G_{vc}\cos\phi_c\sin\theta_c. \quad 1.$$

$$G_{yc} = G_{rc}\cos\phi_c + G_{vc}\sin\phi_c. \quad 2.$$

$$G_{zc} = -G_{tc}\sin\theta_c - G_{rc}\sin\phi_c\cos\theta_c + G_{vc}\cos\phi_c\cos\theta_c. \quad 3.$$

$$p_c = \dot\phi_c\cos\theta_c + \omega_c\cos\phi_c\sin\theta_c. \quad 4.$$

$$q_c = \dot\theta_c - \omega_c\sin\phi_c. \quad 5.$$

$$r_c = -\dot\phi_c\sin\theta_c + \omega_c\cos\phi_c\cos\theta_c. \quad 6.$$

FIG. 4 shows a three gimbal system similar to those used in previous motion base systems. In FIG. 4, an aircraft cockpit (not shown) is mounted in a three gimbal system at the end of an arm 12 of radius r, e.g., 8 feet, rotating at an angular velocity $\omega_c$. The gimbal system includes a C gimbal 15 rotating through an angle $\Psi_c$ about a vertical axis perpendicular to the arm 12, an A gimbal 13 rotating through an angle $\phi_c$ about an axis in the plane of the C gimbal 15 and perpendicular to its axis, and a B gimbal 14 rotating through an angle $\theta_c$ about an axis in the plane of the A gimbal 13 and perpendicular to its axis.

Similar to the two gimbal system of FIG. 3, the three angles $\phi_c$, $\theta_c$, and $\Psi_c$ are related to the transverse, lateral, and longitudinal acceleration components $G_{xc}$, $G_{yc}$, and $G_{zc}$ and the roll, pitch, and yaw angular velocities $p_c$, $q_c$, and $r_c$ experienced by motion base pilots through the following equations:

$$G_{xc} = X\cos\theta_c - Y\sin\phi_c\sin\phi_c + G_{rc}\cos\phi_c\sin\phi_c \quad 7.$$

$$G_{yc} = Y\cos\phi_c + G_{rc}\sin\phi_c \quad 8.$$

$$G_{zc} = -X\sin\theta_c - Y\sin\phi_c\cos\theta_c + G_{rc}\cos\phi_c\cos\theta_c \quad 9.$$

$$p_c = \phi_c\cos\theta_c + (\omega_c + \Psi_c)(\cos\phi_c\sin\theta_c\cos\Psi_c) \quad 10.$$

$$q_c = p100_c\omega_c + \Psi_c)(\sin\phi_c) \quad 11.$$

$$r_c = -\phi_c\sin\theta_c + (\omega_c + \Psi_c)(\cos\phi_c\cos\theta_c) \quad 12.$$

where $$X = G_{rc}\sin\Psi_c + G_{tc}\cos\Psi_c, \text{ and} \quad 13.$$

$$Y = G_{rc}\cos\Psi_c - G_{tc}\sin\Psi_c. \quad 14.$$

Various existing motion bases, such as a short arm vertifuge device or a long arm centrifuge, both manufactured by Emro Engineering Corporation, are suitable for the purposes of a two or three gimbal system. "Vertifuge" is a trademark of Emro Engineering Corporation for a short armed two or three gimbal device. Centrifuge is a generiC term for a long arm two or three gimbal device. The short arm two or three gimbal vertifuge device is well suited for conveying the angular motions associated with spatial disorientation and unusual attitudes experienced by pilots in a low-G environment or without the stress of high-G environment. Conversely, the long armed two- or three-gimbal centrifuge is well suited for conveying the linear forces associated with a high-G environment, while at the same time retaining most of the angular capabilities of the short arm vertifuge device.

C. An Existing Control Algorithm for a Motion Base System

The above incorporated U.S. Pat. No. 4,751,662 to Crosbie discloses an algorithm for controlling a two-gimballed motion base system.

The '662 patent discloses derivation of the following equation for the angular velocity of the arm from equations 1-6:

$$\omega_c = \sqrt[4]{(g^2/r^2)(G_a^2 - 1)} \quad 15.$$

$$\text{where } G_a = \sqrt{G_{xa}^2 + G_{ya}^2 + G_{za}^2} \text{ and}$$

where g is 32.16 ft/sec$^2$ and r is the radius of the arm in feet.

The '662 patent further derives the following equations for control of the A and B gimbals:

$$A: \phi_c = \sin^{-1}\frac{G_{ya}}{G_{rvc}} - (\tan^{-1}G_{rc})\left(\frac{1}{k_1s + 1}\right) + k_{2pa} \quad 16.$$

$$\text{where } G_{rvc} = \sqrt{G^2_{rc} + G^2_{vc}}, \text{ and}$$

where $k_1$ and $k_2$ are roll coefficients.

$$B: \theta_c = \sin^{-1}\frac{G_{xa}}{G_{xza}} + \left(\sin^{-1}\frac{G_{tc}}{G_{xza}}\right)\left(\frac{k_3}{k_4S + 1}\right) - k_{5qa} \quad 17.$$

$$\text{where } G_{xza} = \sqrt{G^2xa + G^2_{za}} \text{ and}$$

where $k_3$, $k_4$, and $k_5$ are pitch coefficients.

The transfer functions $1/(k_1S+1)$ and $k_3/(k_4S+1)$ are further described in Crosbie, R. J. & Kieffer, D. A., "Controlling the Human Centrifuge as a Force and Motion Platform for the Dynamic Flight Simulator", Proceedings of AIAA Flight Simulation Technologies Conference, St. Louis, Mo., Jul. 22-24, 1985.

The above equations were further modified by the introduction of a bias function 115 around the +1 G level to minimize artifacts, as shown in FIGS. 5 and 7. FIG. 5 shows how $G_{za}$ was modified when driving the motion base system according to the bias function of the '662 patent. When motion base system command signals achieve a match between the component linear accelerations in the aircraft with those in the motion base system, $G_{za}$ is modified by the output signal Q of a function generator according to the graph. When $G_{za}$ is at 1.0 G (for example during straight and level flight) the motion base system operates at a $G_{zc}$ of 1.55 G, i.e., with a bias of 0.55 G. When $G_{za}$ is at 2.5 G and above (for example, during a pull-up maneuver) the motion base system $G_{zc}$ matches that of the aircraft. FIG. 5 also shows that the motion base system $G_{zc}$ will never go below approximately 1.05 G.

However, the '662 patent algorithm has several limitations. It cannot simulate negative-G flight, i.e., flight where a pilot experiences a G-force of less than 1 G. Furthermore, the '662 patent algorithm can only control a two-gimbal device with one cockpit orientation, i.e., the upright facing tangential position, as shown in FIG. 6. FIG. 6A shows a circular motion path 117 of a pilot 118 of the motion base system around a central point. Pilot 118 travels on circular path 117 in a cockpit (not shown) on an end of arm 12. The cockpit, and, therefore, the pilot are orientated in an upright facing tangential orientation when the gimbals are in a starting position.

The algorithm of the '662 patent also experiences discontinuities in the gimbal drive circuitry, jolting pilot 118 during quick arm accelerations. In addition, the '662 patent algorithm does not have a means for dynamically optimizing the gimbal motions that are used to negate the motion base generated artifacts during non-steady state flight. (Motion base artifacts are non-desirable "side effect" perceptions experienced by the pilot due to motion base system motion.) Lastly, the '662 patent algorithm does not simulate the yaw perception of a pilot.

D. An Existing Pilot Perceptual Model for a Motion Base System

Above incorporated U.S. Pat. No. 4,751,662 to Crosbie also discloses a pilot perceptual model for an aircraft and for a motion base. The aircraft and motion base perceptual models of the '662 patent are used to determine pitch and roll sensations experienced by pilots in the aircraft and by pilots in the motion base system respectively. (Because the system disclosed by the '662 patent does not simulate yaw perceptions, the model does not determine yaw sensations). The perceptual models of the '662 patent are used to fine-tune the motion base control algorithm so that a motion base system pilot experiences substantially the same pitch and roll sensations as an aircraft pilot performing a same maneuver.

As shown in FIG. 7, an on-line computer 18 programmed with the above listed Equations (15), (16), and (17) receives signals D, E and Q, and signals indicative of the arm radius r and gravity g, to produce control signal F, including arm rotation $\omega_c$, pitch $\theta_c$ and roll $\phi_c$, which connect and drive a motion base system 19. The angular motion and linear forces imparted to a pilot within the motion base system 19 stimulate his visual, proprioceptive and physiological receptors to which he responds at signal A, thus forming a closed loop control system.

Control signals D and E also connect to the input of an on-line computer 21 programmed to generate signals H and I indicative of the perceived roll $\phi'_a$ and pitch $\theta'_a$ angular motions predicted for the pilot in actual flight of the simulated aircraft. The equations for these predicted angular motions, experimentally derived on a human centrifuge and reported in an article by Crosbie, R. J. entitled "Application of Experimentally Derived Pilot Perceptual Angular Response Transfer Functions", Proceedings of the AIAA Flight Simulators Technologies Conference and Technical Display, AIAA-83-1100-CP, Jun. 13-15, 1983: Niagara Falls, N.Y., are as follows:

$$\phi'_a = \phi'_{aa} + \phi'_{va} \qquad 18.$$
$$= \frac{p_a}{G_{zcd} + 1} \cdot \frac{12.48}{(S + 10)(S + 5)} +$$
$$\frac{G_{zcd} \phi_{va}}{G_{zcd} + 1} \cdot \frac{6.66(S + .75)}{(S + 10)(S + .5)}$$

where $G_{zcd} = 1$ when $G_{za} < 1$
$= G_{za}(1/1rs)$ when $G_{za} \geq 1$, and $\phi_{va} = \tan^{-1}(G_{ya})/(G_{zcd})$.

$$\theta'_a = \theta'_{aa} + \theta'_{va} \qquad 19.$$
$$= \frac{q^a}{G_{zcd} + 1} \cdot \frac{12.48}{(S + 10)(S + 2.5)} +$$
$$\frac{G_{zcd} \theta_{va}}{G_{zcd} + 1} \cdot \frac{2.66(S + .75)}{(S + 10)(S + .2)}$$

where $\theta_{va} = \tan^{-1}(G_{xa}/G_{zcd})$.

The first terms $\phi'_{aa}$ and $\theta'_{aa}$ in Equations (18) and (19) represent the pilot's perceived angular displacement of the simulated aircraft due to pure roll and pitch, respectively; the second terms $\phi'_{va}$ and $\theta'_{va}$ represent the pilot's perceived angular displacement of the acceleration vector in the simulated aircraft about the roll and pitch axes, respectively Sensors 22 attached to the motion base system 19 sense the actual transverse, lateral and longitudinal accelerations $G_{xc}$, $G_{yc}$, and $G_{zc}$ and the roll and pitch angular velocities $p_c$ and $q_c$. Sensor output signals J and K corresponding to these parameters are applied to the input of an on-line computer 23, programmed like computer 21, to generate signals L and M indicative of the perceived angular motions of roll $\phi'_c$ and pitch $\theta'_c$ predicted for the motion base system pilot for the same flight command signals C. The equations for signals L and M, derived like Equations (18) and (19), are as follows:

$$\phi'_c = \phi'_{ac} + \phi'_{vc} \qquad 20.$$
$$= \frac{\phi_c}{G_{zcd} + 1} \cdot \frac{12.48 \, S}{(S + 10)(S + 5)} +$$
$$\frac{G_{zcd} \theta_{vc}}{G_{zcd} + 1} \cdot \frac{6.66(S + .75)}{(S + 10)(S + .2)} ,$$

$$\theta'_c = \theta'_{ac} + \theta'_{vc} \qquad 21.$$
$$= \frac{\theta'_c}{G_{zcd} + 1} \cdot \frac{12.48 \, S}{(S + 10)(S + 2.5)} +$$
$$\frac{G_{zcd} \theta_{vc}}{G_{zcd} + 1} \cdot \frac{2.66(S + .75)}{(S + 10)(S + .2)}.$$

The first terms $\phi'_{ac}$ and $\theta'_{ac}$ in Equations (20) and (21) represent the pilot's perceived angular displacement of the motion base system due to pure roll and pitch, respectively; the second terms $\phi'_{vc}$ and $\theta'_{vc}$ represent the pilot's perceived angular displacement of the acceleration vector in the motion base system about the roll and pitch axes, respectively.

The aircraft and motion base system perceived roll angles $\phi'_a$ and $\theta'_c$ in signals H and L are compared and the absolute value of their differences, integrated over a period of time T, are added to a weighting function in a roll comparator 26 to produce signal N at an indicator 28. Also the perceived aircraft and motion base system pitch angles $\theta'_a$ and $\theta'_c$ in signals I and M are compared and the absolute value of their differences, integrated over the time T, are added to a weighting function in a pitch comparator 27 to produce signal P at an indicator 29. The computations are mathematically expressed in accordance with the following equations:

$$\Sigma\phi' = |\Delta\phi'| + W_y|\Delta G_y| \qquad 22.$$
$$= \frac{1}{T} \int_0^T |\phi'_a - \phi'_c| dt +$$
$$W_y \left[ \frac{1}{T} \int_0^T |G_{ya} - G_{yc}| dt \right],$$

$$\Sigma\theta' = |\Delta\theta'| + W_x|\Delta G_x| \qquad 23.$$
$$= \frac{1}{T} \int_0^T |\theta'_a - \theta'_c| dt +$$
$$W_x \left[ \frac{1}{T} \int_0^T |G_{xa} - G_{xc}| dt \right].$$

The second term in each Equation (22) and (23), which is the weighting function, determines the relative influence of angular motion and linear acceleration to the pilot's perception. Therefore, weighting factors $W_y$ and $W_x$ are varied according to the individual pilot's preference to either of these influences. These factors are usually substantially equal to zero and, therefore, are often neglected.

The above-described '662 perceptual model has some limitations, however. As previously stated, it does not determine yaw perceptions and it can not predict pilot perceptions during negative G flight. Its roll perception determination is somewhat inaccurate because roll perception depends somewhat on a perceived yaw. In addition, it can not predict the effects due to cockpit orientations other than upright facing tangential or due to the motions of a third gimbal, such as the C gimbal of FIG. 4.

SUMMARY OF THE INVENTION

The present invention can be used to control either a short arm vertifuge device or a long arm centrifuge having some number of gimbals less than or equal to three.

It is an object of the invention to control a motion base system to replicate the visual, physiological, and proprioceptive sensations experienced by a pilot in a high speed aircraft.

It is a further object of the invention to use the three acceleration vectors of a simulated aircraft and the three angular velocities of the simulated aircraft to approximate the three linear accelerations and to recreate the physiologic sensations of pitch, roll, and yaw.

It is a still further object of the invention to simulate the linear forces of an aircraft in the Cartesian planes using all of the forces of the motion base, i.e. the tangential, radial, and vertical force vectors, It is a still further object of the invention to simulate continuous pitch, roll, and yaw by combining the force vectors of the motion base system with appropriate gimbal rotations. To further achieve the objects and in accordance with the purpose of the invention, as embodied and broadly described herein, the invention comprises: a process for generating a total angular gimbal motion to control pitch in a gimballed motion base system substantially duplicating pilot perceptions from an aircraft simulation.

To further achieve the objects and in accordance with the purpose of the invention, as embodied and broadly described herein, the invention comprises: a process for generating a total angular gimbal motion to control roll in a gimballed motion base system substantially duplicating pilot perceptions from an aircraft simulation.

To further achieve the objects and in accordance with the purpose of the invention, as embodied and broadly described herein, the invention comprises: a process for generating a gimbal motion in a gimballed motion base system substantially duplicating pilot perceptions from an aircraft simulation, wherein the pilot of the simulated aircraft experiences a G force of less than one, and wherein a cockpit of the motion base system initially has a first position.

To further achieve the objects and in accordance with the purpose of the invention, as embodied and broadly described herein, the invention comprises: a process for generating angular gimbal motions to control pitch and roll in a motion base system having a cockpit, an arm, a pitch gimbal, a roll gimbal, and a yaw gimbal, and substantially duplicating pilot perceptions from an aircraft simulation.

To further achieve the objects and in accordance with the purpose of the invention, as embodied and broadly described herein, the invention comprises: a process for generating angular gimbal motions to negate radial and tangential G artifacts in a gimballed motion base system wherein a gimbal is controlled by a gimbal motor, and substantially duplicating pilot perceptions from an aircraft simulation.

To further achieve the objects and in accordance with the purpose of the invention, as embodied and broadly described herein, the invention comprises: a process for generating angular gimbal motions to control pitch and roll in a gimballed motion base system having a cockpit capable of assuming varying orientations, and substantially duplicating pilot perceptions from an aircraft simulation.

To further achieve the objects and in accordance with the purpose of the invention, as embodied and broadly described herein, the invention comprises: a process for generating angular gimbal motion to control yaw perception in a gimballed motion base system having a yaw gimbal, and substantially duplicating pilot perceptions from an aircraft simulation.

To further achieve the objects and in accordance with the purpose of the invention, as embodied and broadly described herein, the invention comprises: a process for comparing perceived roll, pitch, and yaw in a motion base system with perceived roll, pitch, and yaw in a simulated aircraft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises: a process for generating an angular velocity of an arm of a gimballed motion base system substantially duplicating pilot perceptions from an aircraft simulation, the process comprising the steps of: receiving a linear force vector of the simulated aircraft, the linear force vector having Gx, Gy, and Gz components; computing a first angular velocity from the linear force vector and a radius of the arm; receiving a yaw angular velocity of the simulated aircraft; attenuating the yaw angular velocity; filtering the attenuated yaw angular velocity with a washout filter to produce a filtered yaw angular velocity; setting a second angular velocity according to a type of the motion base system and the filtered yaw angular velocity; and computing the angular velocity of the arm from the first angular velocity and the second angular velocity.

BRIEF DESCRIpTION OF THE DRAWINGS

The accompanying drawings, which are incorporated in and constant to a part of the specification, illustrate several embodiments of the invention and together with the description, serve to explain the principles of the invention.

FIG. 8A is a diagrammatic representation of a motion base cockpit in an upright facing inward orientation;

FIG. 8B is a diagrammatic representation of the motion base cockpit of FIG. 8A tilting outboard;

FIG. 8C is a diagrammatic representation of the motion base cockpit of FIG. 8A tilting inboard;

FIG. 9A is a diagrammatic representation of a motion base cockpit in an upright facing outward orientation;

FIG. 9B is a diagrammatic representation of the motion base cockpit of FIG. 9A tilting outboard;

FIG. 9C is a diagrammatic representation of the motion base cockpit of FIG. 9A tilting inboard;

DESCRIPTION OF THE PREFERRED EMBODIMENTS

A General Discussion

Reference will now be made in detail to the present preferred embodiments of the invention, examples of which are illustrated in the accompanying drawings. Wherever possible, the same reference numbers will be used throughout the drawings to refer to the same or like parts.

The present invention overcomes the problems and disadvantages of the prior art by improving upon the algorithm of the '622 patent in the following ways:

1) incorporating a control process to account for the effect of yaw on the arm of the system;

2) incorporating a limited-G bias function for controlling a motion base system capable of producing only a limited G range;

3) incorporating a low-G bias function for controlling a motion base system simulating forces between approximately 1.0 G and 2.0 G;

4) separating the pitch, roll, and omega drive circuitry, thus eliminating artifacts;

5) improving the computation involving the angular velocity of the arm ($\omega_c$) during computation of the A and B gimbal commands;

6) incorporating a negative-G algorithm for simulating G forces less than +1 G;

7) allowing various baseline yaw gimbal (C gimbal) positions;

8) allowing various cockpit orientations; and 9) adding a yaw gimbal (C gimbal) control process The present invention also improves upon the pilot perceptual model of the '622 patent by:

1) incorporating yaw perception; and 2) accounting for the fact that a Gy component of linear acceleration affects both roll perceptions and yaw perceptions.

Figure 1:
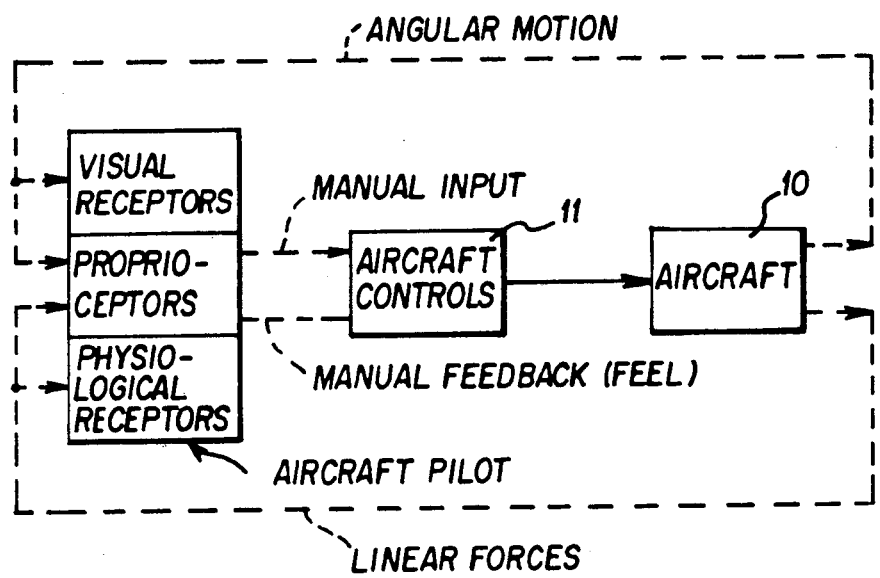
FIG. 1 is a diagrammatic representation of angular motions and linear force stimuli and their receptors in a closed-loop human sensing system for an aircraft pilot.
Figures 2A, 2B, 2C:
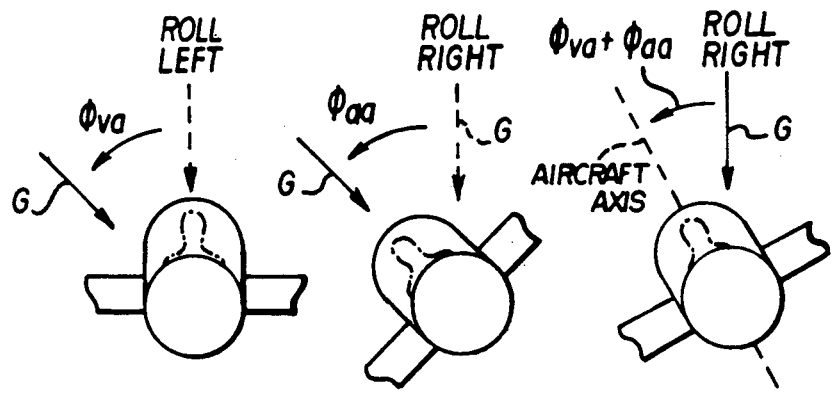
FIG. 2A is a diagrammatic representation of angular and vector rotations perceived by an aircraft pilot about his roll axis during pure vector rotation.
FIG. 2B is a diagrammatic representation of angular and vector rotations perceived by an aircraft pilot about his roll axis during pure angular rotation.
FIG. 2C is a diagrammatic representation of angular and vector rotations perceived by an aircraft pilot about his roll axes during combined angular and vector rotations.
Figure 3:
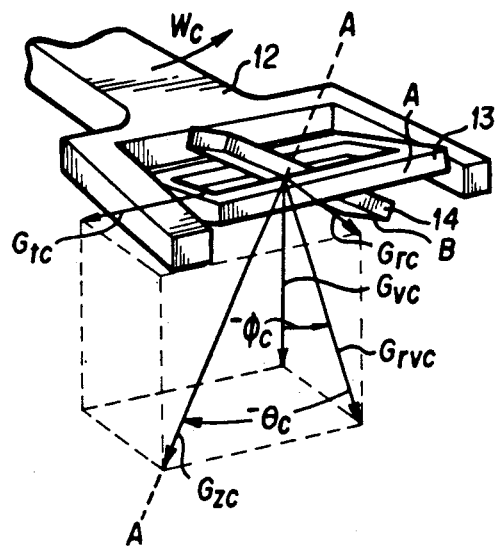
FIG. 3 is a diagrammatic representation of a two gimbal motion base system.
Figure 4:
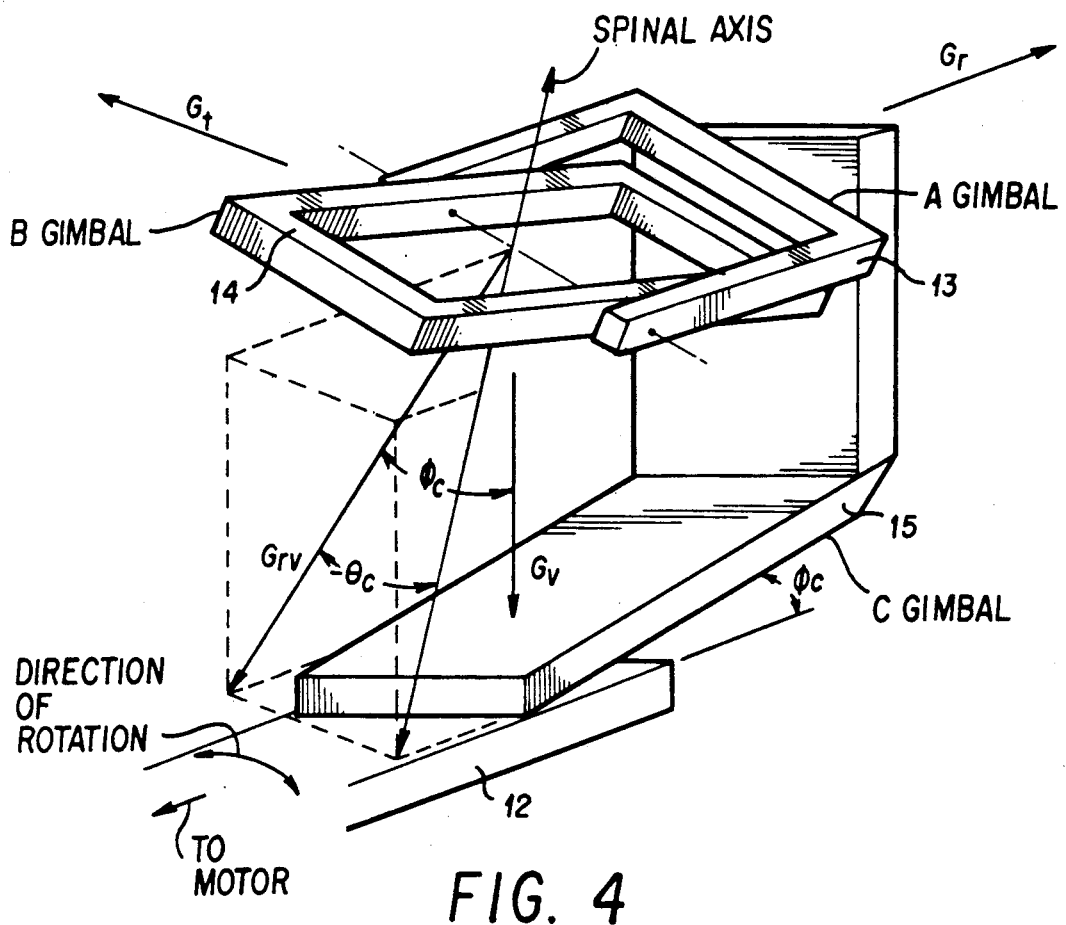
FIG. 4 is a diagrammatic representation of a three gimbal motion base system.
Figure 5:
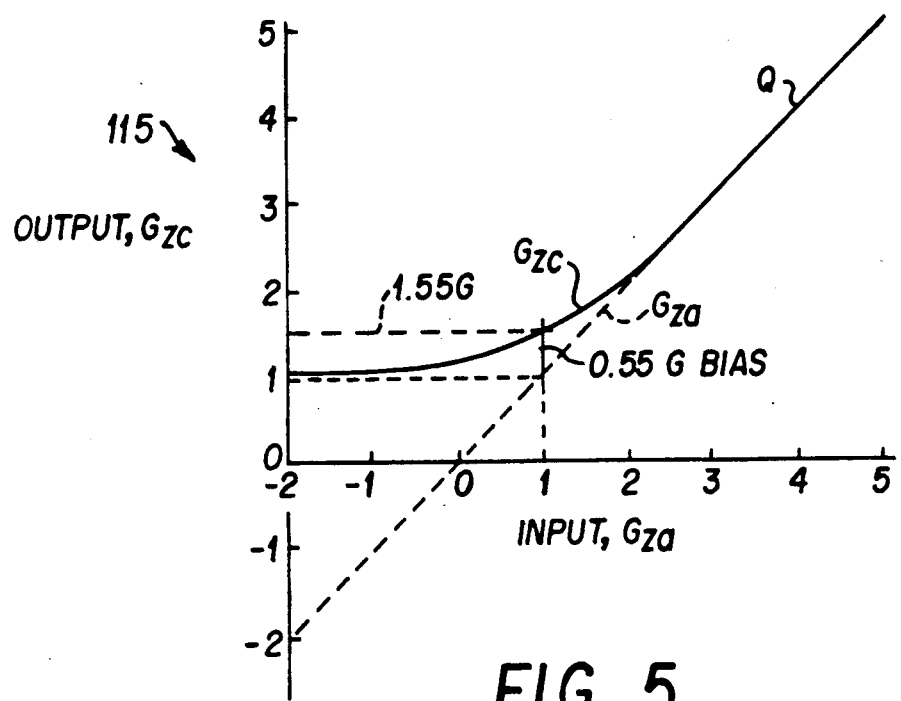
FIG. 5 is a graph of motion base system forces as a function of aircraft forces.
Figure 10:
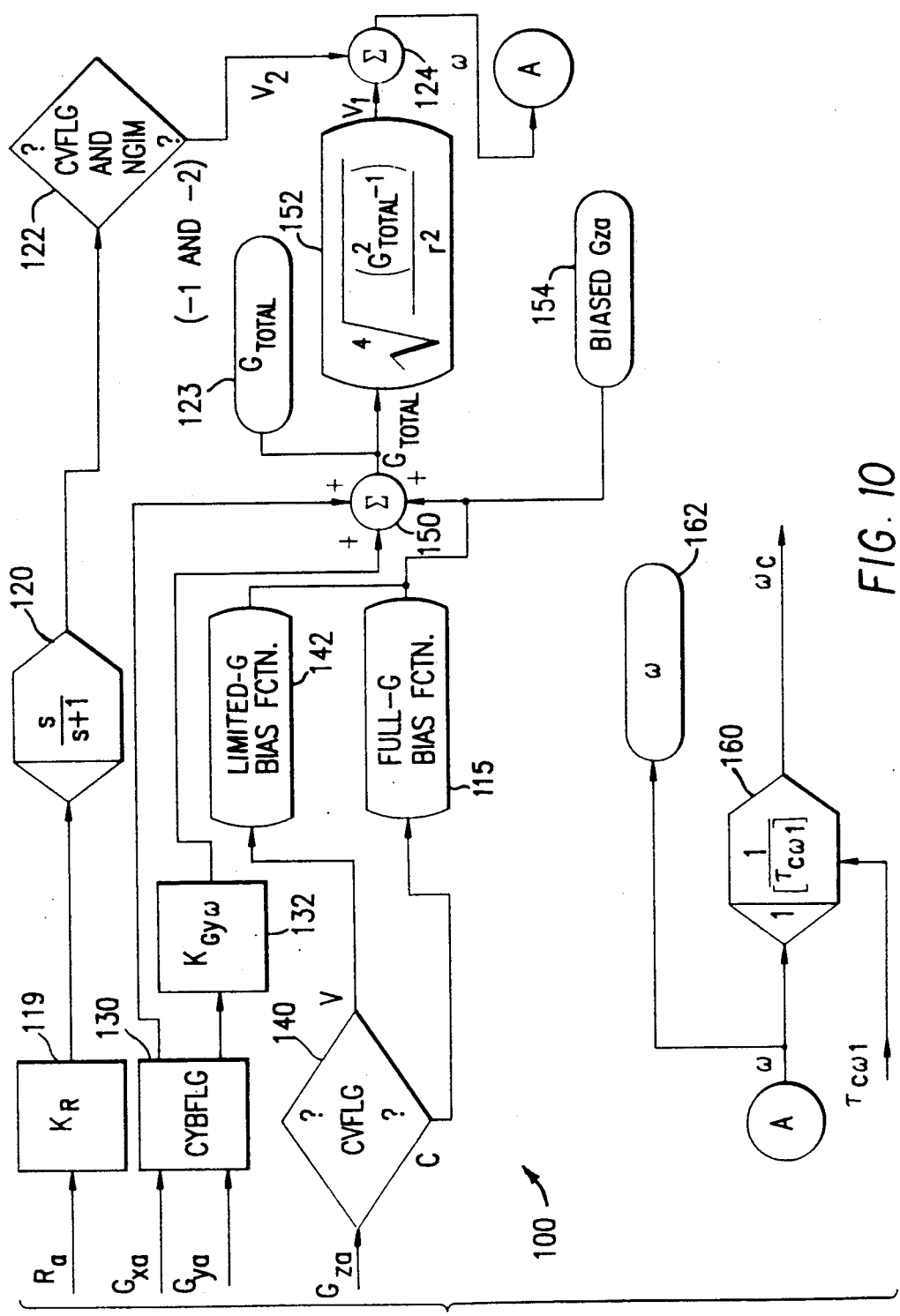
FIG. 10 is a flow diagram of an arm control subprocess of the present invention.
Figure 11:
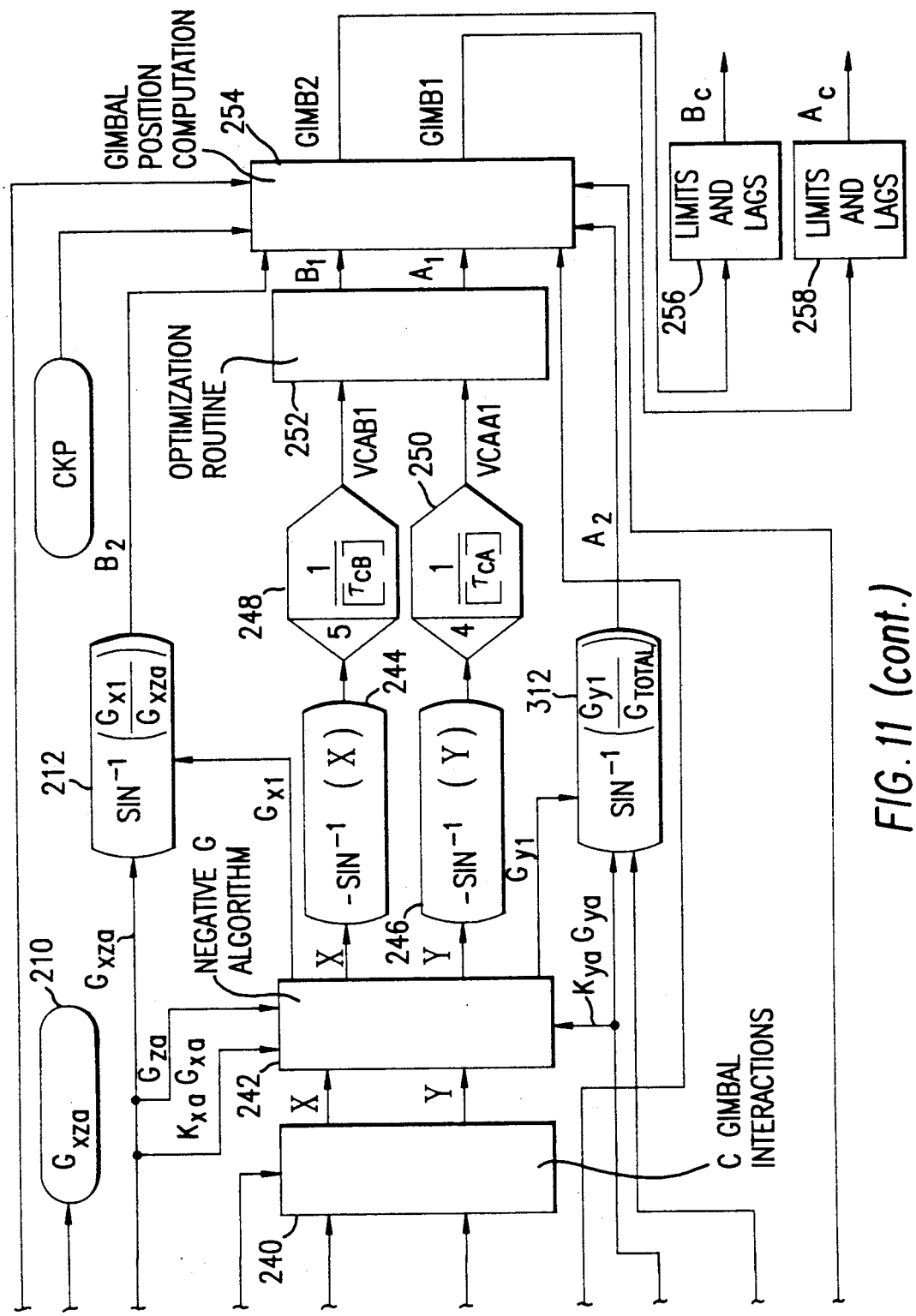
FIG. 11 is a flow diagram of a B gimbal drive subprocess and an A gimbal drive subprocess of the present invention.
Figure 11:
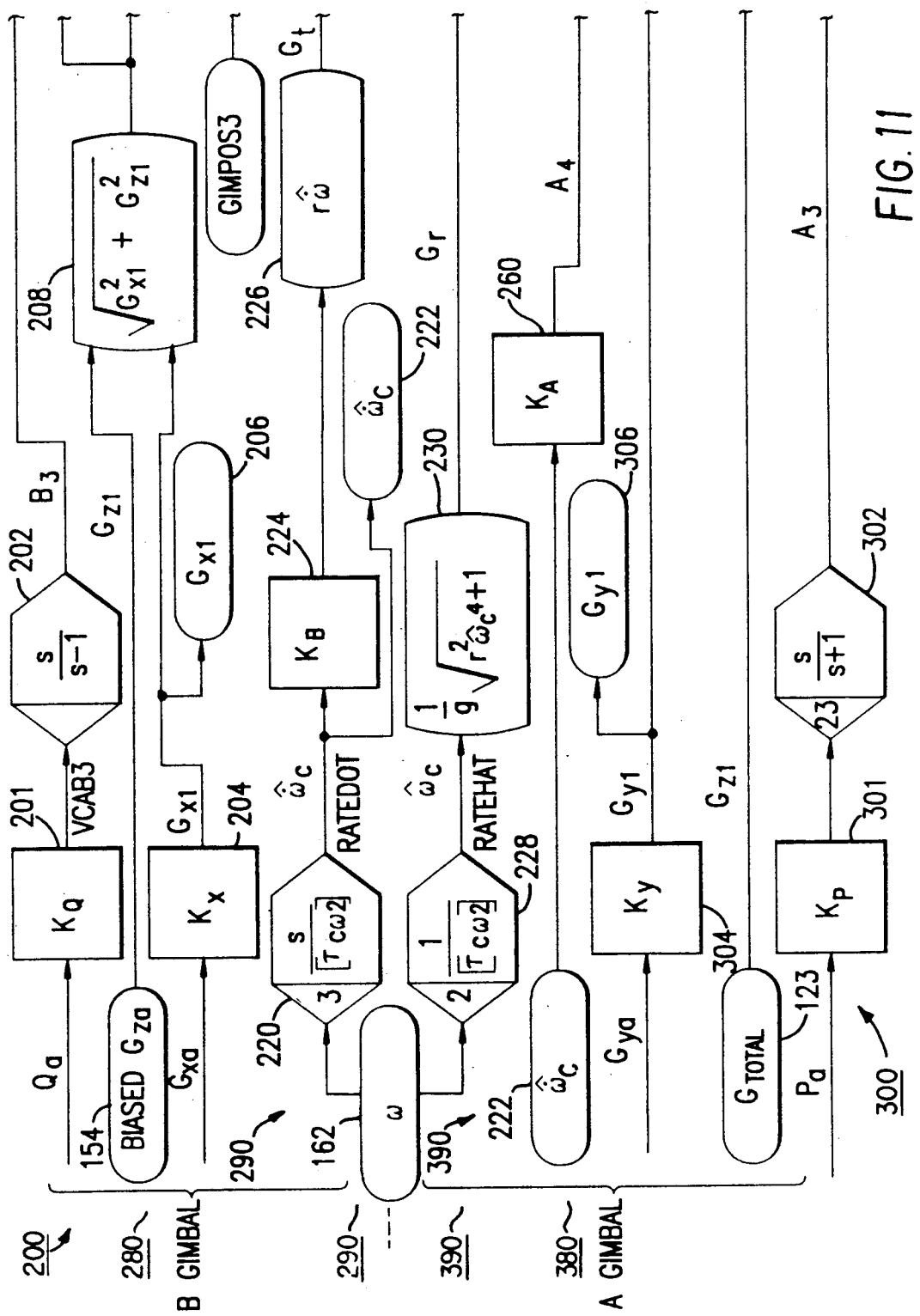
Figure 12:
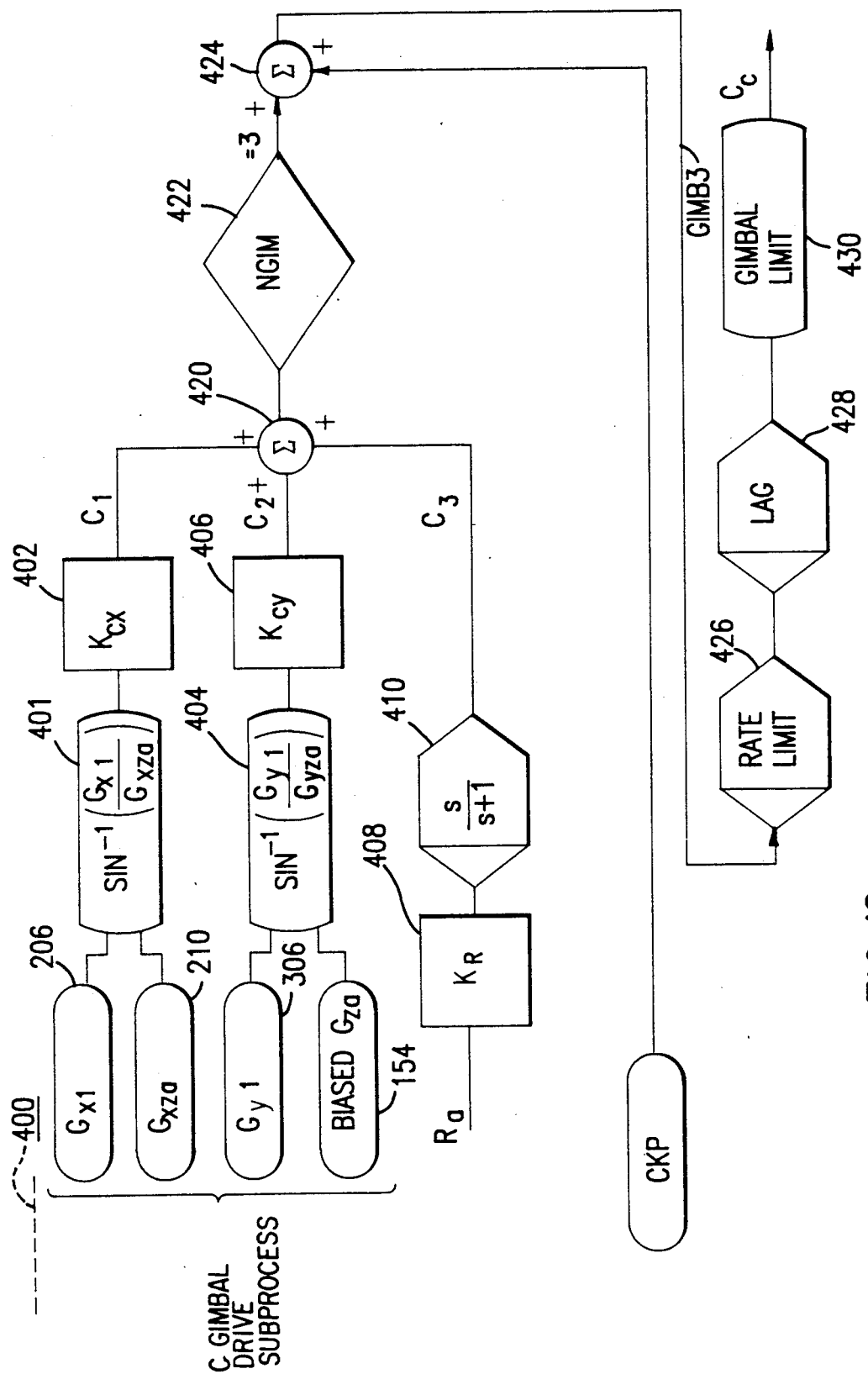
FIG. 12 is a flow diagram of a C gimbal drive subprocess of the present invention.

FIGS. 10–12 are flow diagrams showing gimbal and arm control subprocesses of the present invention. It should be understood that, even though FIGS. 10–12 show a control process for a three gimbal system having an arm moving in an angular motion, the present invention may be adapted for a wide range of motion base system configurations such as: a) a one gimbal system, b) a two gimbal system with the B gimbal fixed in place, c) a two gimbal system with the B gimbal and the arm fixed in place, d) a two gimbal system with only the arm fixed in place, e) a three gimbal system having the arm fixed in place, f) a three gimbal system having the C gimbal fixed in place, and g) a three gimbal system having the B gimbal fixed in place. The present invention has been adapted for each of the above-mentioned configurations. However, the above-mentioned configurations are exemplary only and other motion base system configurations usable with the present invention will be obvious to persons skilled in the art. For example, the present invention could also be used to control a vertical motion base system having an arm moving in a vertical direction instead of angularly. Such a modification would involve changes to the equations of motion described in connection with FIG. 4 so that the equations describe linear motion instead of angular motion.

The control process of the present invention is designed to simulate the six degrees of freedom in flight of a motion base system with two, three, or four degrees of freedom. Note, however, that the less capability a motion base has, the smaller the flight regime that can accurately be simulated.

It is not the intention of the present invention to accurately recreate the three linear accelerations ($G_{xa}$, $G_{ya}$, and $G_{za}$) of an aircraft. This is physically impossible because the motion base system is attached to the earth at its base and cannot physically duplicate the maneuvers of a high performance aircraft.

FIG. 8 shows an upright facing inward orientation of pilot 118 in a cockpit (not shown) of the motion base system. When the gimbals are in an initial position, the cockpit and pilot 118 are rotated around center point 116 on motion path 117 in a direction 119 so that pilot 118 is always facing toward center point 116, as shown in FIG. 8A. Pilot 118 may be tilted outboard or inboard as shown in FIGS. 8B and 8C, respectively.

FIG. 9 shows an upright facing outward orientation of pilot 118 in a cockpit (not shown) of the motion base system. When the gimbals are in an initial position, the cockpit and pilot 118 are rotated around center point 116 on motion path 117 in direction 119 so that pilot 118 is always facing away from center point 116, as shown in FIG. 9A. Pilot 118 may be tilted outboard or inboard as shown in FIGS. 9B and 9C, respectively.

Figure 6A:
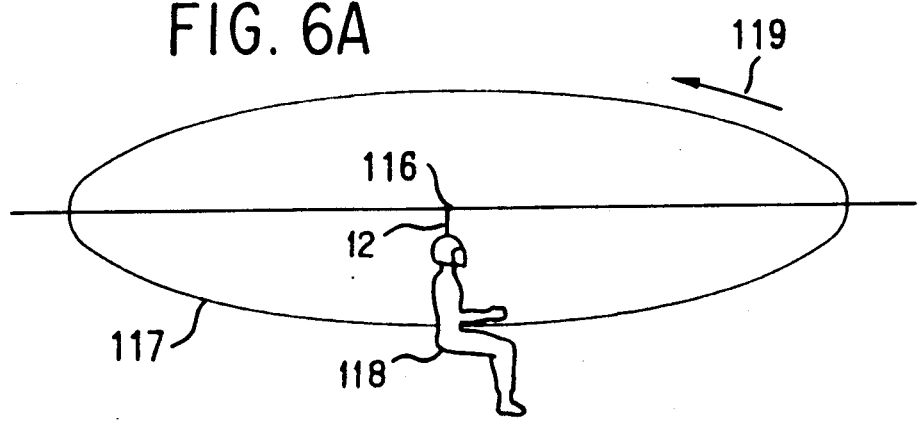
FIG. 6A is a diagrammatic representation of a motion base cockpit in an upright facing tangential orientation.
Figure 6B:
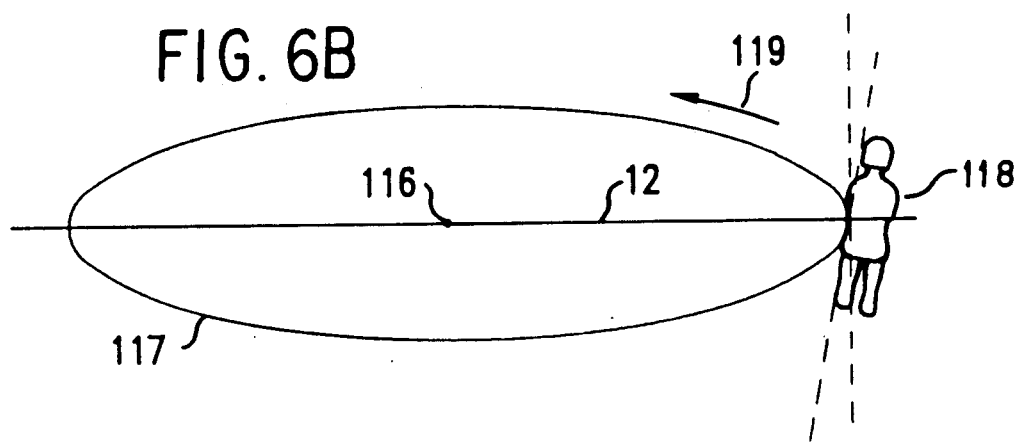
FIG. 6B is a diagrammatic representation of the motion base cockpit of FIG. 6A rotated ninety degrees counterclockwise and tilting outboard.
Figure 6C:
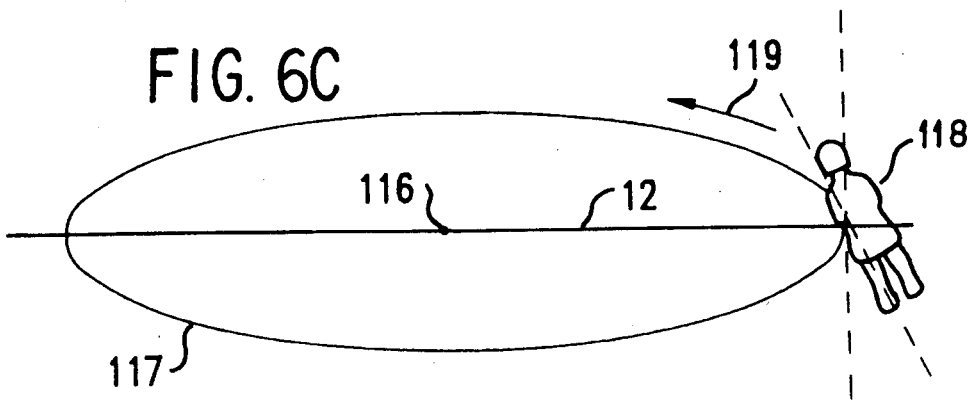
FIG. 6C is a diagrammatic representation of the motion base cockpit of FIG. 6A rotated ninety degrees counterclockwise and tilting inboard.

The present invention can control a motion base system where the cockpit is oriented within the B gimbal in any of the three orientations shown in FIGS. 6A, 8A, and 9A. It is understood that not all motion base systems are capable of all three orientations and that, for a given motion base system configuration, only one or two orientations may be possible. The upright facing tangential orientation of FIG. 6A is a traditionally used orientation. The upright facing inward orientation of FIGS. 8A-8C is preferably used in simulations requiring simulations of large $G_{xa}$ forces, such as simulating a catapulted takeoff from an aircraft carrier. The upright facing outward orientation is preferably used in simulations of spin conditions. All of these orientations may be tilted either outboard, as shown in FIGS. 6B, 8B, and 9B, or inboard as shown in FIGS. 6C, 8C, and 9C, by rotating the gimbal controlling perceived roll, as described in detail below.

FIGS. 10-12 show four subprocesses of the present invention: an arm drive subprocess 100, a B gimbal drive subprocess 200, an A gimbal drive subprocess 300, and a C gimbal drive subprocess 400. Arm drive subprocess 100 creates a linear force environment that the A, B, and C gimbals control and coordinate to yield a linear force environment and pitch, roll, and yaw sensations for a pilot in the motion base system.

B. The Arm Drive Subprocess

As shown in FIG. 10, the arm drive subprocess 100 has as inputs three linear force vectors of the aircraft to be simulated (also called linear acceleration components or linear acceleration vectors), $G_{xa}$, $G_{ya}$, and $G_{za}$, and an aircraft yaw rate (also called an aircraft angular velocity) $R_a$.

Arm drive subprocess 100 comprises a step 119, a filter step 120, a step 122, a step 124, a step 130, a step 132, a test step 140, a limited G bias function step 142, a full G bias function step 115, a step 150, a step 152, and filter step 160.

Aircraft yaw rate $R_a$ input to the arm drive subprocess allows control of yaw perception via arm 12. This subprocess is useful in a three gimbal device, or in a two gimbal device where the cockpit is oriented inboard, as shown in FIG. 8, or outboard, as shown in FIG. 9 In step 119, yaw rate $R_a$ is scaled by a predetermined constant $K_R$, for example, 0.4. Filter step 120 incorporates a washout filter with a time delay of one second. After approximately three seconds without a change in the yaw rate, filter step 120 begins outputting a "0" value instead of yaw rate $R_a$. Step 122 preferably tests whether the current motion base system is a three gimbal device. If so not, the output value of filter step 120 is passed to step 124 as an angular velocity V2 for processing described below.

Both the $G_{xa}$ and the $G_{ya}$ components first pass through step 130. In step 130, $G_{xa}$ and $G_{ya}$ are scaled by the constants +1.0 or −1.0, depending on the orientation of the cockpit. In a preferred embodiment, the cockpit is upright facing tangential and step 130 scales $G_{xa}$ and $G_{ya}$ by 1.0. The scaled $G_{xa}$ and $G_{ya}$ components are then passed to step 150 and step 132, respectively. In step 132, the $G_{ya}$ component is further scaled by a predetermined constant $K_{GY\omega}$, for example, 0.2, and passed to step 150.

The $G_{za}$ component first passes through test step 140, similar to test step 130. Next, depending on the value of the $G_{za}$ component and on a current motion base system configuration, the $G_{za}$ component is scaled by one of two bias functions in one of full-G bias function step 115 and limited-G bias function step 142.

Full-G bias function 115 has been described in detail in the above incorporated U.S. Pat. No. 4,751,662 to Crosbie. Full-G bias function 115 is optimized for long arm, high-G devices. It is preferably a polynomial function that biases the 1.0 G of earth's gravity to 1.5 G, for example, thereby allowing for the sensations of variations in $G_{za}$ at or below the 1.0 G of earth's gravity, while matching the aircraft $G_{za}$ at and above 3.0 G. Alternately, full-G bias function 115 can be a multi-part function, implementing a different bias function for values of $G_{za}$ at or below 2.0 G, between 2.0 G and 3.0 G, and at or above 3.0 G.

Limited-G bias function 142 is optimized for short arm, low-G devices. It is a function that also allows for the sensations of variations in $G_{za}$ at or near the 1.0 G of the earth's gravity. However, limited-G bias function 142 gradually saturates as the aircraft $G_{za}$ exceeds that of the motion base. Thus, the limited-G bias function takes the limited G capability of the motion base configuration into account.

The form of the limited G bias function 142 depends on an expected range of flight maneuvers to be simulated. When the motion base system is a short arm device capable of providing up to 2.0 G's for example, and when the motion base will be simulating low-G flying maneuvers, i.e. when $G_{za}$ will usually be between 1.0 and 1.5 G's, limited-G bias function 142 is preferably a spline function. Thus, the limited-G bias function will begin saturating as $G_{za}$ exceeds 1.5 G's. Thus, the motion base pilot will feel a largest amount of change in the G forces for $G_{za}$ less than 1.5 G. In contrast, when the motion base system is a short arm device capable of providing up to 2.0 G's, for example, and when the motion base system will be simulating high-G manuevers, i.e., when $G_{za}$ regularly will be in the range 4.0 to 6.0 G's, limited-G bias function 142 is preferably a piece-wise linear function. Thus, the most change to $G_{zc}$ will be felt in the range 4.0 to 6.0 G's. Furthermore, when the motion base system is not expected to simulate a G force higher than the capability of the motion base system, limited-G bias function 142 can be other types of functions, such as a parabolic function or an exponential function.

In step 150 of FIG. 10, the $G_{xa}$ component, the scaled $G_{ya}$ component, and the biased $G_{za}$ component are added by vector addition to produce a $G_{total}$ vector describing the biased linear G force of the aircraft that the motion base system is to simulate. This biased linear G force is converted to an arm angular velocity V1 in step 152 according to the formula:

$$V1 = \sqrt[4]{(g^2/r^2)(G_{total}^2 - 1)}$$

Next, in step 124, angular velocity V1 is added to angular velocity V2 of step 122, which is either the scaled yaw angular velocity $R_a$ or zero. Thus, step 124 yields an arm angular velocity $\omega$ that may or may not be modified to control yaw, depending on whether the yaw angular velocity $R_a$ is in a steady state.

Lastly, arm angular velocity $\omega$ passes through a filter step 160, which delays arm angular velocity $\omega$ by a time constant of $\tau_{c\omega l}$, for example, 0.5, to compensate for differences in the motor characteristics of arm 12 and the A, B, and C gimbals. Arm 12 may be, for example, 50 feet long and controlled by a large motor with a long onset time, a large overshoot value, and a long settling time. In contrast, some gimbal motors used in the motion base system according to the present invention are relatively quite small and require much less time to control. Thus, arm angular velocity $\omega_c$ from step 160 is used to drive arm 12.

Figure 15:
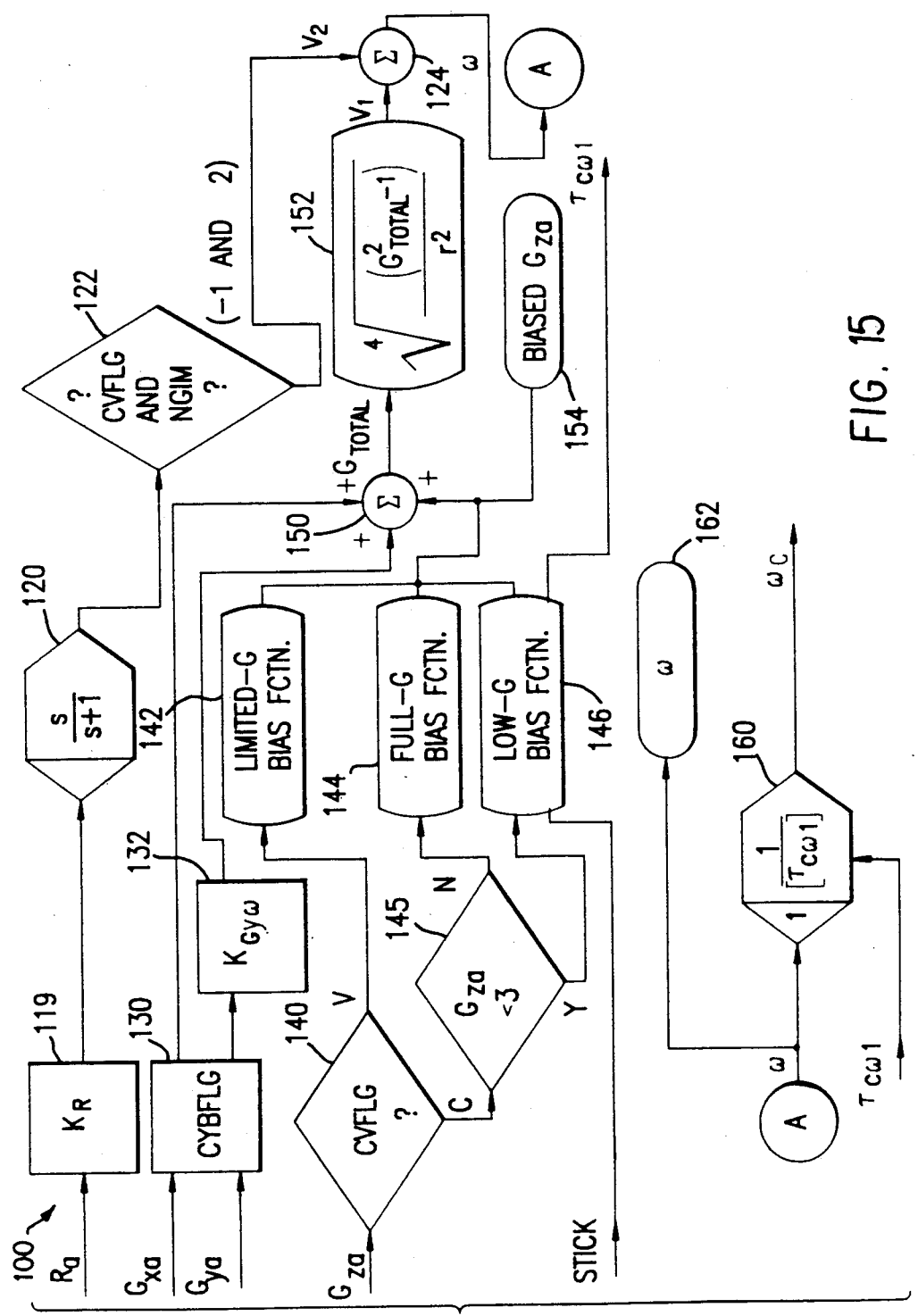
FIG. 15 is a flow diagram of an arm control subprocess of a second preferred embodiment of the present invention.
Figure 16A:
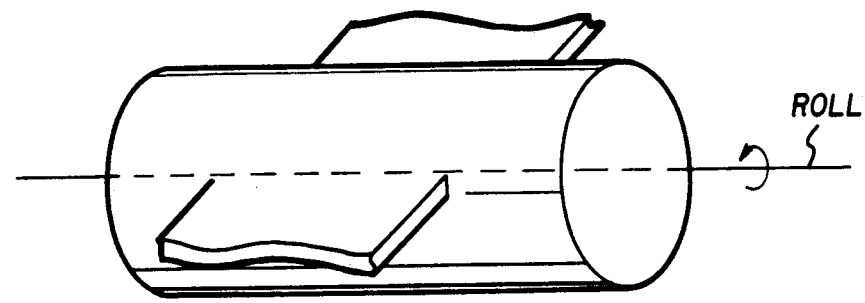
FIG. 16A is a diagram of a roll axis of an aircraft.
Figure 16B:
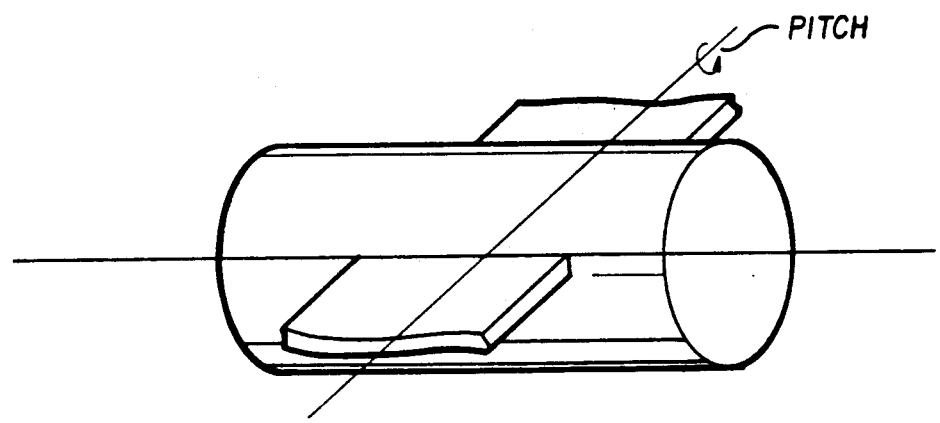
FIG. 16B is a diagram of a pitch axis of an aircraft.
Figure 16C:
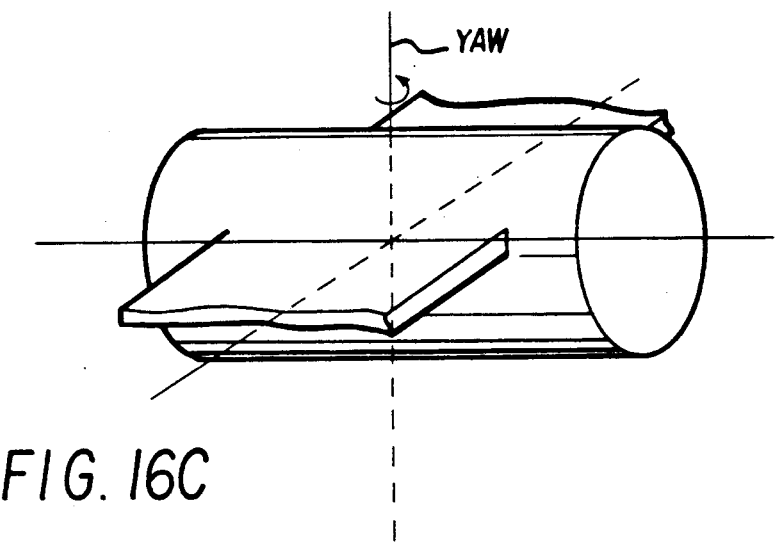
FIG. 16C is a diagram of a yaw axis of an aircraft.

In a second embodiment of the present invention, arm drive subprocess 100 contains a third bias function, as shown in FIG. 15. The third bias function is a multi-function routine that reduces long arm motion base artifacts for flight simulation while retaining high G fidelity. Step 145 determines whether $G_{za}$ is less than some upper G limit, 3.0 G, for example. During a low-G phase of flight simulation on long arm devices, the changes in arm speed for relatively small changes in simulated aircraft speed create relatively large changes in simulated $G_z$, which is disturbing to the pilot flying the motion base system. Thus, instead of changing the arm speed to position the force vector on the pilot, the arm speed is held constant and the pilot is positioned, by the use of the gimbals, with respect to the vector. The algorithm returns to matching the motion base $G_z$ to the aircraft $G_{za}$ at and above 3 G. During the transition from low G to high G, (greater than 3.0 G, for example) the algorithm uses a predictive routine based on the longitudinal position of the pilot's control stick to determine the optimum method for accelerating the arm. Other factors used in the predictive algorithm are aircraft dynamics related. Thus, the low-G algorithm is aircraft specific. Low G bias step 146 is further described "Centrifuge Control Algorithm Enhancement Analysis: Low G. Provision," Veda Report No. 33514-88U/P3511-002, delivered to the Naval Air Development Center, Warminster, Pa., on May 12, 1988, which is herein incorporated by reference.

C. The B and A Gimbal Drive Subprocesses

As shown in FIG. 11, B gimbal drive subprocess 200 comprises a pitch section 280 and an omega section 290. Similarly, A gimbal drive subprocess 300 comprises a roll section 380 and an omega section 390. Omega sections 290 and 390 create a base line position for the B and A gimbals from which desired pitch and roll perceptions can be effected. Pitch and roll sections 280 and 380 compute the gimbal motions required to create the desired sensations of pitch and roll, respectively. The outputs of pitch and roll sections 280 and 380 and omega sections 290 and 390 are combined in gimbal position computation step 254, which will be described in more detail below.

Omega section 290 includes a step 220, a step 224, a step 226, a step 240, a step 242, a step 244, a step 248, a step 252, a step 254, and a step 256.

Similarly, omega section 390 includes a step 228, a step 230, a step 240, a step 242, a step 246, a step 250, a step 252, a step 254, and a step 258.

Omega sections 290 and 390 of A and B gimbal drive subprocesses 200 and 300 are similar in design. One difference between the two omega sections is that omega section 290 of B gimbal drive subprocess 200 includes time delayed differentiator step 220, while omega section 390 of A gimbal drive subprocess 300 includes time delay step 228. However, both step 220 and step 228 use a filter constant of $\tau_{cw2}$, for example 0.5, so that the outputs of steps 220 and 228 are in phase.

Arm velocity $\omega$ from arm drive subprocess 100 is input to time delay differentiator step 220, which produces an arm angular acceleration $\omega_c$. The value $\omega_c$ is attenuated by a predetermined constant $K_B$, 0.7, for example, in step 224 to produce a scaled arm angular acceleration $\omega_c$. Step 226 uses scaled arm angular acceleration $\omega_c$ to produce an angular acceleration component $G_t$, which is a tangential G component caused by the angular acceleration of arm 12, by means of the equation:

$$G_t = 1\omega_c/g.$$

where r is a radius of arm 12.

Similarly, $G_r$, which is a radial component caused by the angular velocity of arm 12 is computed in time delay step 228 and step 230, which converts a time delayed angular velocity $\omega_c$ from step 228 to $G_r$ by means of the equation:

$$G_r = (r \cdot \omega_c^2)/g.$$

Figure 13:
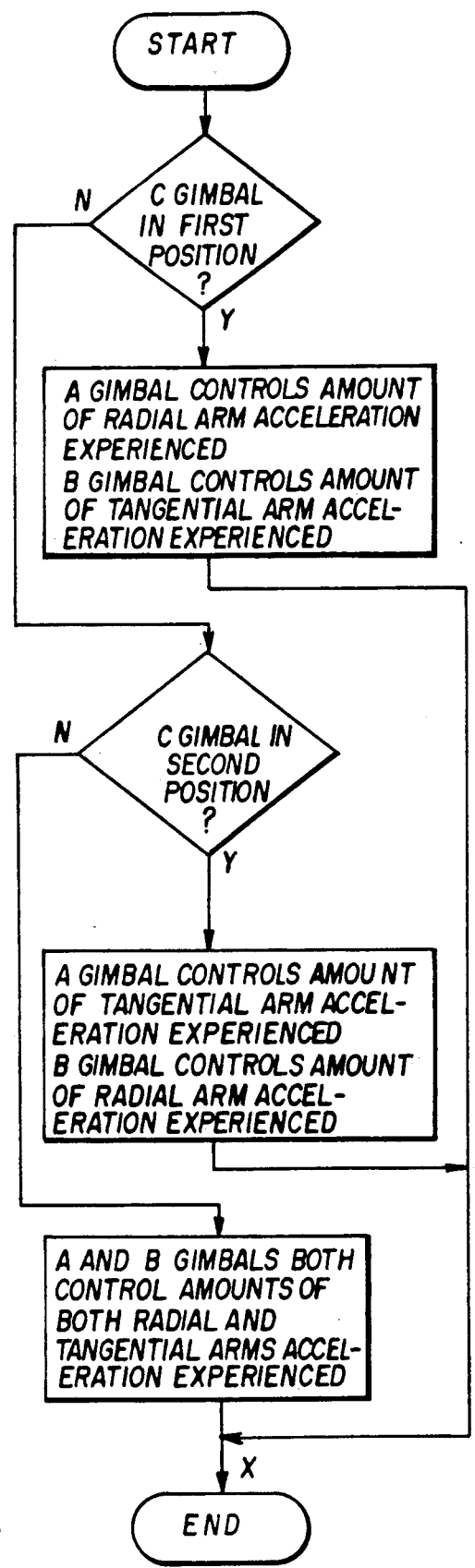
FIG. 13 is a flow diagram of a C gimbal interaction algorithm of the A and B gimbal drive subprocesses of FIG. 11.

Both $G_r$ and $G_t$ are input to C gimbal interaction step 240, along with a value GIMPOS3 indicating an angular position of the C (yaw) gimbal. C gimbal interaction step 240 modifies the functions of the A and B gimbals based on the position of the C gimbal as shown in FIG. 13. It is understood that FIG. 13 is shown for illustrative purposes only, and does not represent steps performed by a digital computer. FIG. 13 illustrates the effects of the A and B gimbals when the C gimbal is at various predetermined positions. The actual computation involves Equations (13) and (14). If the C gimbal is at a first predetermined position, i.e., with the axis of the A gimbal perpendicular to arm 12 in the horizontal plane, the A gimbal will control the effect of the radial acceleration of arm 12 experienced by the motion base pilot, and the B gimbal will control the effect of the tangential acceleration experienced by the motion base pilot. Similarly, if the C gimbal is at a second predetermined position, i.e., with the axis of the A gimbal parallel to arm 12 in the vertical plane, the A gimbal will control the effect of the tangential acceleration and the B gimbal will control the effect of the radial acceleration. Similarly, when the C gimbal is at some position other than the first or second predetermined positions, the A and B gimbals will each control the effect of some portion of the radial and the tangential acceleration.

The following discussion assumes that the C gimbal is in the first predetermined position. However, it will be obvious to one skilled in the art that, if the C gimbal is in the second predetermined position, the discussion below will still be true if the roles of the A and B gimbals are exchanged.

C gimbal interaction step 240 outputs an X value and a Y value, signifying that portion of the radial and/or tangential vectors controlled by the A and B gimbals, respectively. The X and Y values are then input to a negative-G algorithm step 242.

Negative-G algorithm step 242 allows the motion base system to simulate flight less than 1 G. This preferably is accomplished by tilting the cockpit to outboard, as shown in FIGS. 6B, 8B, and 9B. The outboard tilt places a pilot so that his head is tilted away from the center of the circle described by arm 12 and, if he is facing in the direction of motion, gives the pilot the perception that he is experiencing a negative G force. Note that C gimbal interaction step 240 must be performed before negative-G algorithm step 242 so that the roll and pitch gimbals can be established correctly before altering the cockpit orientation.

Negative-G algorithm step 242 has as inputs biased $G_{za}$ from arm drive subprocess 100, scaled $G_{ya}$ from roll section 380 of the A gimbal drive subprocess 300, and scaled $G_{xa}$ from pitch section 280 of B gimbal drive subprocess 200. These inputs are used to compute a total G value to be simulated by the motion base system. Negative-G algorithm step 242 produces four outputs: X and Y, of FIGS. 13 and 14, which become B and A gimbal angles, respectively, and $G_{x1}$ and $G_{y1}$, which are, respectively, the $G_x$ component controlled by the B gimbal motion and the $G_y$ component controlled by the A gimbal motion. $G_x$ and $G_y$, are input to steps 212 and 312 described later.

Note that, because the $G_x$, $G_y$, and $G_z$ components have been scaled, the total G value to be simulated is actually compared to the total G of the motion base as defined by the radial, tangential, and vertical accelerations of arm 12:

$$\text{Total } G_c = \sqrt{G_t^2 + G_r^2 + 1 - G_v^2}$$

Thus, the total G to be simulated by the motion base may actually be greater than 1.0 and still represent a negative G force in the simulated aircraft.

Simulation of negative G is not simply a matter of positioning the motion base system pilot into a negative $G_z$ condition, but one of providing a control algorithm which would enable the pilot to fly in and out of that condition in the middle of a realistic flight scenario. That is, the control algorithm which enables the pilot to fly the motion base system and perceive realistic motion cues must be extended to include the negative G realm.

Aerodynamically, a negative $G_{za}$ maneuver is generated when the pilot initiates a pitch or a roll command to the aircraft. As a result, the pilot's acceleration is reduced from positive $G_z$ (above 1.0 G), through zero G (1.0 G), to negative $G_{za}$ (below 1.0 G). Since ground based facilities cannot accurately simulate the total G force environment in the region of $[-1.0, +1.0]$ G, the result is a compromise. This compromise must be made, however, in such a manner as to provide a sense of realistic motion to the motion base system pilot. Thus, if a roll right is the cause of a negative $G_z$ condition, the pilot must sense a right roll prior to entering the negative G condition.

In order to simulate a negative $G_{za}$ maneuver, the aircraft angular rate (Pa or Qa) that accompanies the maneuver will be used to move the gimbals to provide the sensation. However, since the G-environment of all ground based systems is bounded by the one G total of the Earth's gravity, an unrealistic Gy or Gx caused by the Pa or Qa command, respectively, must be developed during the transition from positive to negative $G_z$. This is the compromise that must be made. This compromise will be used when the absolute value of the total aircraft G is less than the absolute value of the total motion base G, which includes the earth's gravitational force 1.0 G.

Thus if the negative $G_{za}$ command is initiated with a roll right, the aircraft "P" term in the control algorithm will develop the roll sensation for the motion base system pilot through the motion of the A gimbal. This will also develop an unrealistic $G_y$ for the motion base system pilot. This $G_y$ will be perpetuated by the use of an artificially augmented Gya that will be developed to maintain the one G total of Earth's gravity and to position the pilot for the negative $G_z$ sensation. The equation for the aircraft $G_y$ component of the A gimbal ($A_2$) is:

$$A_1 = \sin^{-1}\left(\frac{G_{y1}}{G_{T t 1}}\right) = \cos^{-1}\left(\frac{G_{za}}{G_{T t 1}}\right)$$

where,

For positive $G_{za}$ flight, $G_{y1} = K_{ya} \cdot G_{ya}$, and

For negative $G_{za}$ flight, $$G_{y1} = K_{ya} \cdot G_{ya} + K_{y1}\sqrt{y^2 + G_t^2 - \frac{(G_{za} + X \cdot \sin(B))^2}{\cos^2(B)}}$$

where
B = angle of B gimbal deflection
K = gain terms
$G_y$ = one G due to gravity
X = $G_R \cdot \sin(C) + G_T \cdot \cos(C)$
Y = $G_t \cdot \cos(C) + G_r \cdot \sin(C)$.

Similarly, if the initial motion is a roll left, then the above equations are true for both cases with the only difference being the "+" sign before Ky1 becomes a "−" sign for the negative $G_{za}$ case.

Likewise, if the negative $G_{za}$ command is initiated with a pitch up, the aircraft "Q" term in the control algorithm will develop the pitch sensation for the motion base system pilot through the motion of the B gimbal. This will also develop an unrealistic Gx for the motion base system pilot. This Gx will be perpetuated by the use of an artificially augmented $G_{xa}$ that will be developed to maintain the one G total of Earth's gravity and to position the pilot for the negative Gz sensation. The equation for the aircraft Gx component of the B gimbal (B) is:

$$B_2 = \sin^{-1}\left(\frac{G_{x1}}{G_{xza}}\right) = \cos^{-1}\left(\frac{G_{za}}{G_{xza}}\right).$$

For positive $G_{za}$ flight, $G_{x1} = K_{xa} \cdot G_{xa}$
For negative $G_{za}$ flight, $$G_{x1} = K_{xa} \cdot G_{xa} + K_{x1}\sqrt{x^2 + (y \cdot \sin(A) - G \cdot \cos(A))^2 - G_{za}^2}$$

where A = angle of A gimbal deflection.

Similarly, if the initial motion is a pitch down then the above equations are true for both cases with the only difference being the "+" sign before Kx1 becomes a "+" sign for the negative $G_{za}$ case.

Finally, it is required that the control algorithm of the present invention be able to smoothly control the transition back to positive $G_{za}$ flight. This method will depend on the mechanical design of the motion base system itself. If the motion base has the capability of continuous 360 degrees rotation in the pitch and roll axes, the return to positive $G_{za}$ can be attained by continuing to roll or pitch in the same direction. If either or both axes are limited, then the direction of gimbal motion must be retraced. This does not preclude, however, returning to positive $G_{za}$ flight using the other gimbal (i.e., using the pitch gimbal if the initial motion were roll).

Negative-G algorithm step 242 outputs X and Y values representing the effects of radial and tangential forces controlled by the A and B gimbals. Steps 244 and 246, respectively, convert X and Y into steady state angles of rotation for the A and B gimbals, respectively, to negate motion base artifacts. First order filter steps 248 and 250 control the phasing of the angle commands to the A and B gimbals according to predetermined filter constants $\tau_{CB}$ and $\tau_{CB}$, respectively. For example, $\tau_{CA}$ may be 0.2 and $\tau_{CB}$ may be 0.5, to compensate for differing characteristics of the A and B gimbals.

The filtered A and B angles from steps 248 and 250 are input to an optimization routine step 252, which creates a gimbal response to the input angles in such a way that the vector and angular components of the gimbal motion cancel each other during the transient, as well as the steady state, thereby generating angles $B_1$ and $A_1$ that totally negate the motion base artifacts. Angles $B_1$, and $A_1$, are input to gimbal position computation step 254 to be described later.

Pitch section 280 of B gimbal drive subprocess 200 has three inputs: a pitch rate (an angular velocity) $Q_a$ of the simulated aircraft, a biased $G_{za}$ linear acceleration from arm drive subprocess 100, and a linear acceleration $G_{xa}$ of the simulated aircraft. Step 201 scales pitch rate $Q_a$ by a predetermined constant $K_Q$, for example, 0.7. Step 202 filters the scaled $Q_a$ and produces an angle $B_3$ creating a pilot perception of the pitch rate $Q_a$. Step 204 scales linear acceleration $G_{xa}$ by a predetermined constant $K_x$, for example, 0.9, producing a $G_{x1}$ value to be used in a later step. The $G_{x1}$ value and the biased $G_{za}$ value are input to a step 208, which computes a vector $G_{xza}$ in the XZ plane to be used in a later step. Step 212 converts the vectors $G_{xza}$ and $G_{x1}$ to an angle $B_2$ creating a pilot perception of the $G_{xa}$ component.

Roll section 380 of A gimbal drive subprocess 300 has three inputs: a roll rate (an angular velocity) $P_a$ of the simulated aircraft, a $G_{total}$ linear acceleration from arm drive subprocess 100, and a linear acceleration $G_{ya}$ of the simulated aircraft. Step 301 scales roll rate Pa by a predetermined constant $K_p$, for example, 0.7. Step 302 filters the scaled $P_a$ and produces an angle $A_3$ creating a pilot perception of the roll rate $P_a$. Step 304 scales the linear acceleration $G_{ya}$ by a predetermined constant $K_y$, for example, 0.4, producing a $G_{y1}$ value to be used in the negative G algorithm B.

$\omega$ from step 162 of the omega section 290 of the B gimbal drive subsystem 200 is scaled, filtered and differentiated at step 260, by a predetermined gain constant $K_A$ and time delay $\tau_1$ to produce a second value for tangential G that is in phase with the total G value from the aircraft. This value is subtracted from the total aircraft G in step 306 to produce the value $G_{Tt1}$. The $G_{y1}$ value resulting from the negative G algorithm and the $G_{Tt1}$ value are input to step 312, which converts the vectors $G_{Tt1}$ and $G_{y1}$ to an angle $A_2$ creating a pilot perception of the $G_{ya}$ component.

Gimbal position computation step 254 adds the separately computed angles $A_1$, $A_2$, and $A_3$ to obtain a final A gimbal motion GIMB1. Similarly, gimbal position computation step 254 adds the separately computed angles $B_1$, $B_2$, and $B_3$ to obtain a final B gimbal motion GIMB2. Computation of GIMB1 and GIMB2 depend on the orientation of the cockpit, as determined from input CKP. For example, if the cockpit is in a facing tangential orientation, GIMB1 and GIMB2 are computed by the following equations:

$$GIMB2 = B_1 + B_2 + B_3.$$

$$GIMB1 = A_1 + A_2 + A_3.$$

However, if the cockpit, for example, is oriented upright focusing outward as in FIG. 9, GIMB1 and GIMB2 are computed by the following equations:

$$GIMB2 = B_1 - A_2 - A_3.$$

$$GIMB1 = A_1 - B_2 - B_3.$$

Lastly, the limits and lay of angles GIMB1 and GIMB2 are checked, respectively in steps 256 and 258 to ensure that they do not exceed either a "soft" limit in the motion base software or a "hard" limit, such as a physical stop on the gimbal mechanism. Angles GIMB1 and GIMB2 are also adjusted in steps 256 and 258 to account for communication lags for the motion base system. For example, a typical vertifuge device has a communications lag of 50 μs and a typical centrifuge has a communications lag of 200 μs.

D. The C Gimbal Drive Subprocess

As shown in FIG. 12, C gimbal drive subprocess 400 includes a step 401, a step 402, step 404, a step 406, a step 408, a step 410, a step 420, a step 422, a step 424, a step 426, a step 428, and a step 430. C gimbal drive subprocess 400 serves a dual purpose. A first, and more common, purpose of the C gimbal drive subprocess 400 is to expedite the orientation of the pitch and roll gimbals (normally the B and A gimbals, respectively) to efficiently position them with respect to the total G of the simulated aircraft. In this case, constants $K_{cx}$ and $K_{cy}$ are 1.0 and constant $K_R$ is 0. A second purpose is to impart yaw motion sensations to the pilot. In this case, constants $K_{cx}$ and $K_{cy}$ are 0 and constant $K_R$ is 1.0. The second purpose is most effective when both the pitch and roll gimbals are in a substantially upright position.

C gimbal drive subprocess 400 has four vector inputs: $G_{x1}$ and $G_{xza}$ from B gimbal drive subprocess 200, $G_{y1}$ from A gimbal drive subprocess 300, and biased $G_{Tt1}$ from arm drive subprocess 100. C gimbal drive subprocess 400 also receives yaw rate (angular yaw velocity) $R_a$ and cockpit orientation indicator CKP 500. Steps 400 and 404 determine an angle between $G_{x1}$ and the plane $G_{xza}$ and between $G_{y1}$ and the vector $G_{Tt1}$, respectively. ($G_{yza}$ in step 404 is a vector sum of $G_y$ and biased $G_{za}$.) In step 402, the output of step 401 is scaled by the predetermined constant $K_{cx}$ to produce an angle $C_1$. Similarly, in step 406, the output of step 404 is scaled by the predetermined constant $K_{cy}$ to produce an angle $C_2$. In step 408, yaw rate $R_a$ is scaled by the predetermined constant $K_R$ and input to a washout filter step 410, which outputs a zero value when its input is in a steady state. Thus, step 420 will either produce an output of $C_1 + C_2$ or the scaled yaw rate $R_a$, depending on which of the inputs to step 420 are zero. If, in step 422, the motion base system is determined to have three gimbals, then cockpit orientation angle CKP is added to the output of step 420 in step 424 to produce an angle GIMB3 to control the C gimbal for one of the two purposes mentioned above. Limits and lag steps 426, 428, and 430, similar to steps 256 and 258 of A and B gimbal drive subprocesses 200 and 300 described above, adjust angle GIMB3 according to the limits of the motion base system.

E. The Pilot Perceptual Simulator

Figure 7:
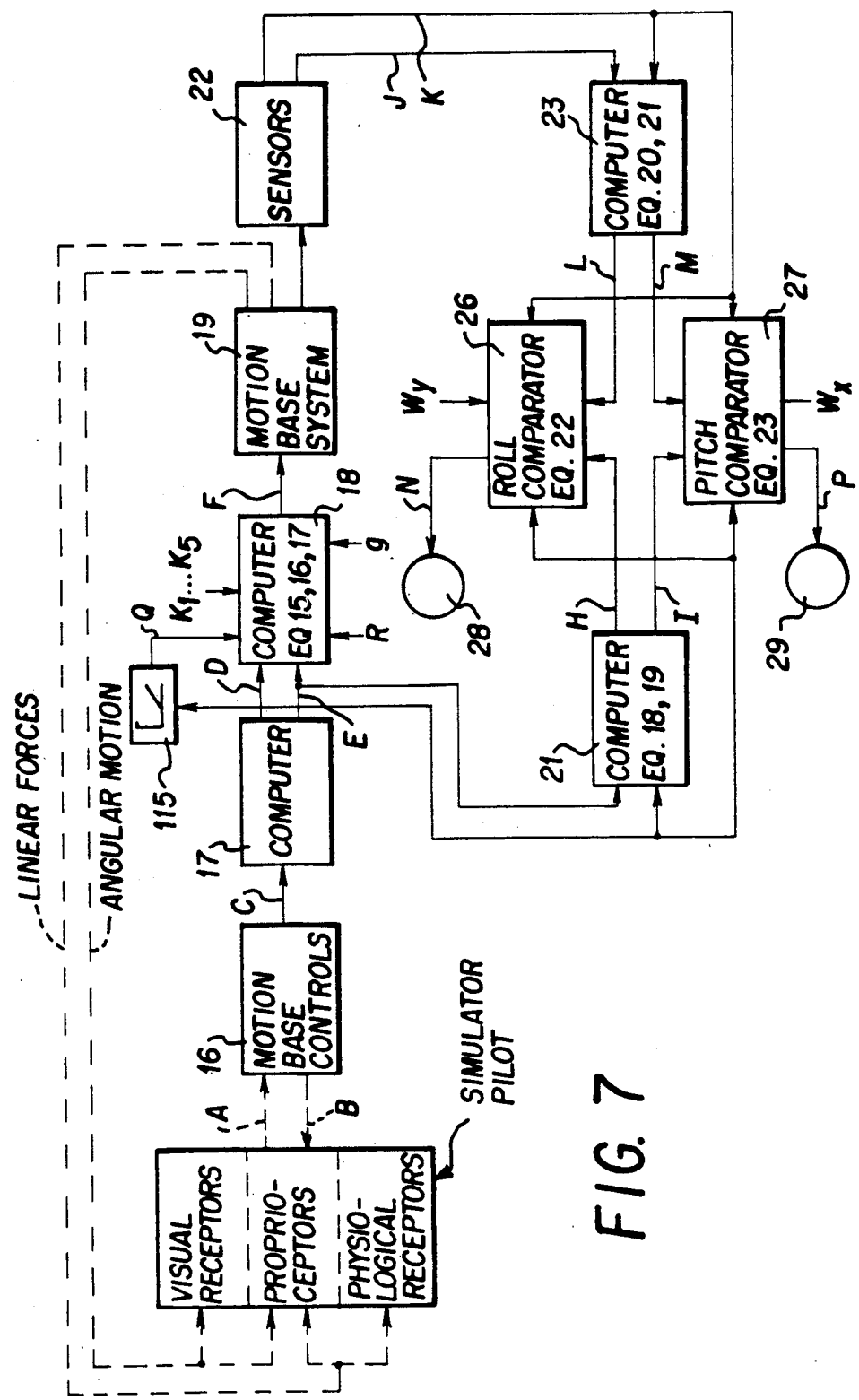
FIG. 7 is a block diagram of a motion base control system.
Figure 14:
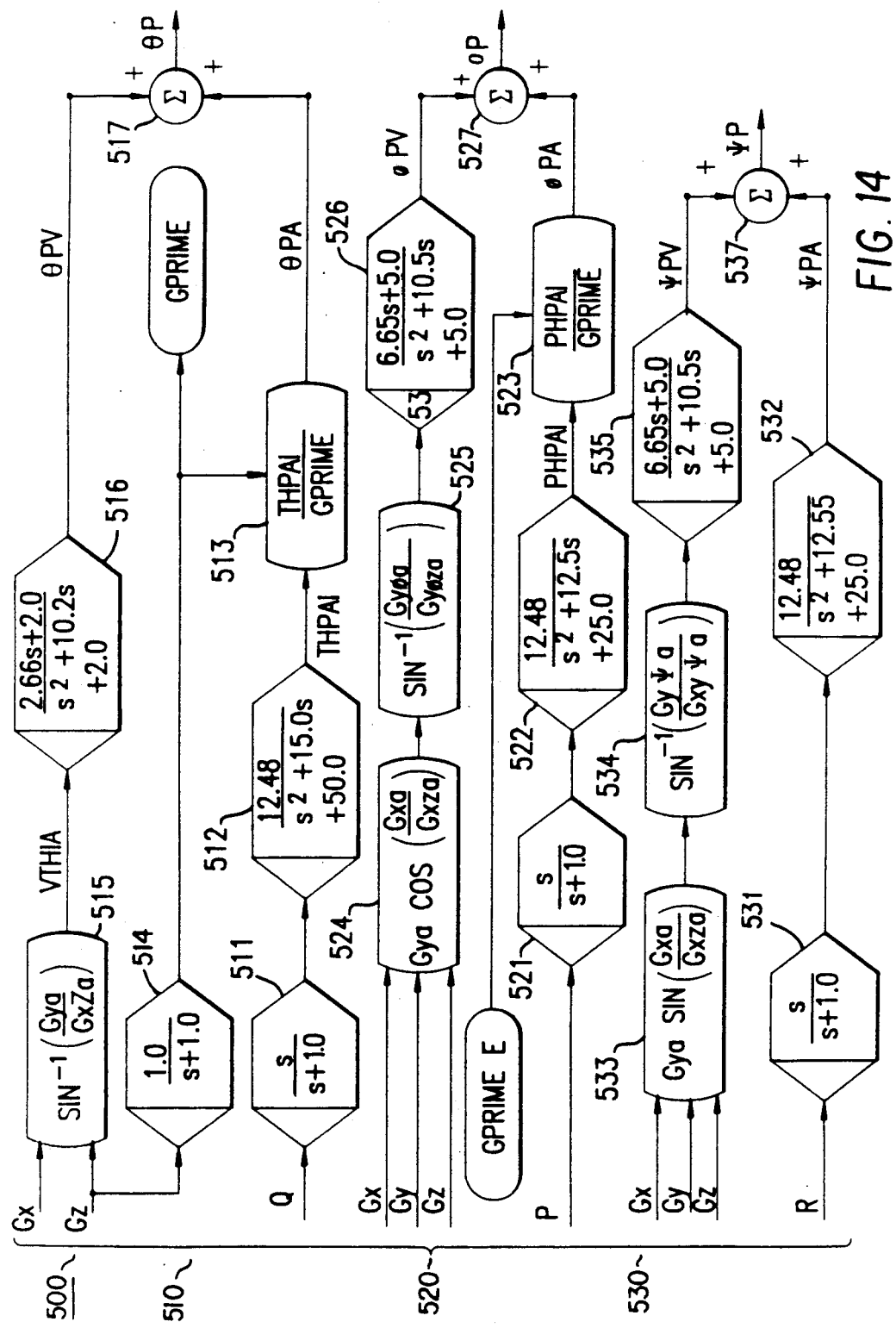
FIG. 14 is a flow diagram of a pilot perceptual model according to the present invention.

FIG. 14 shows a flow chart for a pilot perceptual model 500, which can be implemented in a system similar to that of elements 21-29 of FIG. 7. Pilot perceptual model 500 predicts what angular motions a pilot would sense when flying a particular maneuver in either an aircraft or a motion base system. Pilot perceptual model 500 also facilitates the optimization of the arm drive and gimbal drive subprocesses of the motion base system and allows the motion base system to be fine-tuned to fit the preferences of an individual pilot. Pilot perceptual model 500 is empirically based on the response of human proprioceptive systems to motion stimuli. It can angular responses of a pilot in either an aircraft or a motion base system.

Pilot perceptual model 500 includes three sections for pitch, roll, and yaw predictions, 510, 520, and 530, respectively. Each section has two parts, one for computing an angular component and one for computing a rotating vector component of a perceived angular motion. Note that, because of the nature of human proprioceptors, an angular motion perceived by a pilot does not necessarily match the angular motion of the aircraft or motion base system. Thus, pilot perceptual model 500 is able to predict substantially identical pitch, roll, and yaw perceptions for differing angular movements of the aircraft and motion base system.

Pilot perceptual model 500 receives six inputs: $G_x$, $G_y$, and $G_z$ components of the actual vector motion of the aircraft or motion base system, and a roll rate (angular velocity) P, a pitch rate (angular velocity) Q, and a yaw rate (angular velocity) R of the actual angular motion aircraft or motion base system.

Pitch prediction section 510 receives three inputs: $G_x$, $G_z$, and Q. Washout filter step 511 outputs Q, or, if Q has been in a steady state for substantially 3.0 seconds, "0." The value from step 511 is transformed by an empirically derived second order transfer function in step 512 to produce an angular component THPA1 of the perceived pitch. Step 515 computes an angle between $G_x$ and the vector formed by the vector sum of $G_x$ and $G_z$ to produce angle VTH1A, which is transformed by an empirically derived transfer function in step 516. Filter step 514 delays $G_z$ to produce GPRIME. Step 513 then computes a rotating vector component of the perceived pitch. Step 517 sums the angular and vector components from steps 513 and 516 and outputs a pitch perception $\theta_p$.

Roll prediction section 520 receives five inputs: $G_x$, $G_y$, $G_z$, GPRIME from pitch prediction section 510, and roll rate P. Washout filter step 521 outputs P, or, if P has been in a steady state for substantially 3.0 seconds, "0." The value from step 521 is transformed by an empirically derived second order transfer function in step 522 to produce an angular component of the perceived roll. Step 524 computes a component of $G_y$ pertaining to roll motion and step 525 computes an angle between the roll component of $G_y$ and the vector formed by the vector sum of the roll component of $G_y$ and $G_z$. Step 526 transforms the resultant vector rotation by an empirically derived second order transform function. Step 523 then computes an angular component of the perceived roll. Step 527 sums the angular and rotating vector components from steps 523 and 526 and outputs a roll perception $\phi_p$.

Yaw prediction section 530 receives four inputs: $G_x$, $G_y$, $G_z$, and R. Washout filter step 531 outputs R, or, if R has been in a steady state for substantially 3.0 seconds, "0." The value from step 531 is transformed by an empirically derived second order transfer function in step 532 to produce an angular component of the perceived yaw. Step 533 computes a component of $G_y$ pertaining to yaw motion and step 534 computes an angle between the yaw component of $G_y$ and the vector formed by the yaw component $G_y$ and $G_x$. Step 535 transforms the resultant vector rotation by an empirically derived second order transform function. Step 537 sums the angular and rotating vector components from steps 532 and 535 and outputs a yaw perception $\Psi_p$.

In addition to the steps shown in FIG. 14, other preferred embodiments of the pilot perceptual model of the present invention include the following features: 1) they account for the negative G algorithm of FIG. 11 by multiplying the vector components by +1.0 or −1.0, depending on whether the motion base system is simulating a negative G state. (Preferably, the vector is multiplied by −1.0 when the cockpit is tilted outboard and by +1.0 otherwise.) and 2) they account for the cockpit position interaction algorithm.

Other embodiments will be apparent to those skilled in the art from consideration of the specification and practice of the invention disclosed herein. It is intended that the specification and examples be considered as exemplary only, with a true scope of the invention being indicated by the following.

What is claimed is:

1. A process for generating an angular velocity of an arm of a gimballed motion base system substantially duplicating pilot perceptions from an aircraft simulation, including a processor, said process performed by the processor and comprising the steps of:
   receiving a signal representing a linear force vector of the simulated aircraft, said linear force vector having Gx, Gy, and Gz components;
   computing a first angular velocity from the linear force vector signal and a radius of the arm;
   receiving a signal representing a yaw angular velocity of the simulated aircraft;
   attenuating the received yaw angular velocity signal;
   filtering the attenuated yaw angular velocity with a washout filter to produce a filtered yaw angular velocity;
   setting a second angular velocity according to a type of the motion base system and the filtered yaw angular velocity;
   computing the angular velocity of the arm from said first angular velocity and said second angular velocity; and
   sending a signal representing the computed angular velocity to the arm to control the angular velocity of the arm to the computed angular velocity.

2. The process of claim 1, wherein the step of setting the second angular velocity according to the type of the motion base system includes:

setting the second angular velocity to the filtered yaw angular velocity when the motion base system has at most two gimbals; and setting the second angular velocity to zero when the motion base system has a number of gimbals greater than two.

3. The process of claim 1, further including the step of:

filtering the angular velocitY of the arm to compensate for differences in arm and gimbal motor characteristics of the motion base to produce a final angular velocity.

4. The process of claim 1, wherein the motion base system includes a memory, and further including the steps of:

storing the first angular velocity in the memory; and
storing the second angular velocity in the memory.

5. A process for generating an angular velocity of an arm of a gimballed motion base system substantially duplicating pilot perceptions from an aircraft simulation, said gimballed motion base system including a processor, said process performed by the processor and comprising the steps of:

receiving a signal representing a linear force vector of the simulated aircraft, said linear force vector having Gx, Gy, and Gz components;

receiving a signal representing a yaw angular velocity of the simulated aircraft;

scaling the Gy component by a first predetermined value to produce a scaled Gy value;

biasing the Gz component to produce a biased Gz component according one of a plurality of predetermined bias functions depending on a type of the motion base system;

adding the Gx component, the scaled Gy component, and the biased Gz component to produce a biased linear force vector;

computing a first angular velocity from the biased linear force vector and a radius of the arm;

computing a second angular velocity from the received yaw angular velocity according to a predetermined function;

computing the angular velocity of the arm from said first angular velocity and said second angular velocity; and sending a signal representing the computed angular velocity to the arm to set the angular velocity of the arm to the computed angular velocity.

6. The process of claim 5, wherein the step of biasing the Gz component includes the steps of:

biasing the Gz component according to a limited-G bias function to produce the biased Gz component when the motion base system can produce only a predetermined limited G range; and biasing the Gz component according to a full-G bias function to produce the biased Gz component when the motion base system can produce a predetermined normal G range and the Gz component is greater than a second predetermined value.

7. The process of claim 6 wherein the step of biasing the Gz component according to the limited-G bias function is performed when the arm of the motion base system is a short arm.

8. The process of claim 6 wherein the step of biasing the Gz component according to the full-G bias function is performed when the arm of the motion base system is a long arm.

9. The process of claim 5, wherein the motion base system includes a memory, and wherein the step of receiving a signal representing a linear force vector of the simulated aircraft includes the step of receiving and storing in the memory the signal representing the linear force vector of the simulated aircraft, said linear force vector having Gx, Gy, and Gz components;

wherein the step of receiving a signal representing a yaw angular velocity of the simulated aircraft includes the step of receiving and storing in the memory the signal representing the yaw angular velocity of the simulated aircraft;

wherein the step of scaling the Gy component includes the step of scaling the stored Gy component by the first predetermined value to produce the scaled Gy value;

wherein the step of biasing the Gz component includes the step of biasing the stored Gz component to produce the biased Gz component according one of the plurality of predetermined bias functions depending on the type of the motion base system;

wherein the step of adding the Gx component, the scaled Gy component, and the biased Gz component includes the step of adding the stored Gx component, the scaled Gy component, and the biased Gz component to produce the biased linear force vector; and wherein the step of computing a second angular velocity from the yaw angular velocity includes the step of computing the second angular velocity from the stored yaw angular velocity according to the predetermined function.

10. A process for generating an angular velocity of an arm of a gimballed motion base system substantially duplicating pilot perceptions from an aircraft simulation, the gimballed motion base system including a processor, said process performed by the processor and comprising the steps of:

receiving a signal representing a linear force vector of the simulated aircraft, said linear force vector having Gx, Gy, and Gz components;

receiving a signal representing a yaw angular velocity of the simulated aircraft;

scaling the Gy component by a first predetermined value to produce a scaled Gy value;

biasing the Gz component according to a limited-G bias function to produce a biased Gz component when the motion base system can produce only a predetermined limited G range;

biasing the Gz component according to a full-G bias function to produce a biased Gz component when the motion base system can produce a predetermined normal G range and the Gz component is greater than a second predetermined value;

adding the Gx component, the scaled Gy component, and the biased Gz component to produce a biased linear force vector;

computing a first angular velocity from the biased linear force vector and a radius of the arm;

computing a second angular velocity from the yaw angular velocity;

computing the angular velocity of the arm from said first angular velocity and said second angular velocity; and sending a signal representing the computed angular velocity to the arm to set the angular velocity of the arm to the computed angular velocity.

11. The process of claim 10, wherein the step of biasing the Gz component according to the limited-G bias function to produce the biased Gz component includes the step of:

converting the Gz component to the biased Gz component based on a linear relation between a predetermined range of Gz for the simulated aircraft and the predetermined limited Gz range capable of being produced by the motion base system;

12. The process of claim 10, wherein the step of biasing the Gz component according to the limited-G bias function to produce the biased Gz component includes the step of:

converting the Gz component to the biased Gz component based on a spline function.

13. The process of claim 10, wherein the step of biasing the Gz component according to the limited-G bias function to produce the biased Gz component includes the step of:

converting the Gz component to the biased Gz component based on a piece-wise linear function.

14. The process of claim 10, wherein the motion base system includes a memory, and wherein the step of receiving a signal representing a linear force vector of the simulated aircraft includes the step of receiving and storing in the memory the signal representing the linear force vector of the simulated aircraft, said linear force vector having Gx, Gy, and Gz components;

wherein the step of receiving a signal representing a yaw angular velocity of the simulated aircraft includes the step of receiving and storing in the memory the signal representing the yaw angular velocity of the simulated aircraft;

wherein the step of scaling the Gy component by the first predetermined value includes the step of scaling the stored Gy component by the first predetermined value to produce the scaled Gy value;

wherein the step of biasing the Gz component according to a limited-G bias function includes the step of biasing the stored Gz component according to the limited-G bias function to produce the biased Gz component when the motion base system can produce only the predetermined limited G range;

wherein the step of biasing the Gz component according to a full-G bias function includes the step of biasing the Gz component according to the full-G bias function to produce the biased Gz component when the motion base system can produce the predetermined normal G range and the Gz component is greater than the second predetermined value;

wherein the step of adding the Gx component, the scaled Gy component, and the biased Gz component includes the step of adding the stored Gx component, the scaled Gy component, and the biased Gz component to produce the biased linear force vector; and wherein the step of computing a second angular velocity includes the step of computing the second angular velocity from the stored yaw angular velocity.

15. A process for generating a total angular gimbal motion to control pitch in a gimballed motion base system substantially duplicating pilot perceptions from an aircraft simulation, the gimballed motion base system including a plurality of gimbals and a processor, said process performed by the processor and comprising the steps of:

receiving a signal representing a pitch rate of the simulated aircraft;

receiving a signal representing a Gx component of a linear force vector of the simulated aircraft;

receiving a signal representing an angular velocity of an arm of the motion base system;

receiving a signal representing a biased Gz component of the linear force vector of the simulated aircraft that is between substantially 1 G and a predetermined maximum G value;

receiving a signal representing a yaw gimbal position;

computing a first angular motion for negating motion base-generated tangential G using the angular velocity of the arm and the yaw gimbal position;

computing a second angular motion for creating a motion base pilot perception of the pitch rate of the simulated aircraft using the pitch rate of the simulated aircraft;

computing a third angular motion for creating a motion base pilot perception of the Gx component using the Gx component and the biased Gz component;

computing a total angular gimbal motion using the first, second, and third angular gimbal motions; and sending a signal representing the computed total angular gimbal motion to the gimbals to set the total angular gimbal motion of the gimbals to the computed total angular gimbal motion.

16. The process of claim 15, wherein the step of receiving a yaw gimbal position includes the steps of:

receiving a zero yaw gimbal position when a yaw gimbal is absent from the motion base system; and receiving a non-zero yaw gimbal position when the motion base system includes a yaw gimbal.

17. The process of claim 15, wherein the gimbals of the system are controlled by motors, wherein the step of computing the first angular motion of the pitch gimbal for negating motion base-generated tangential G using the angular velocity of the arm and the yaw gimbal position includes the step of computing a pitch gimbal time delayed value to compensate for differences in arm and gimbal motor characteristics of the motion base system.

18. The process of claim 15, wherein the step of computing the first angular motion for negating motion base-generated tangential G using the angular velocity of the arm and the yaw gimbal position further includes the step of:

differentiating the angular velocity of the arm to create a time delayed angular acceleration of the arm.

19. The process of claim 15, wherein the motion base system includes a memory, and wherein the step of receiving a signal representing a pitch rate of the simulated aircraft includes the step of receiving and storing in the memory the signal representing the pitch rate of the simulated aircraft;

wherein the step of receiving a signal representing a Gx component of a linear force vector of the simulated aircraft includes the step of receiving and storing in the memory the signal representing the Gx component of the linear force vector of the simulated aircraft;

wherein the step of receiving a signal representing an angular velocity of an arm of the motion base system includes the step of receiving and storing in the memory the signal representing the angular velocity of the arm of the motion base system;

wherein the step of receiving a signal representing a biased Gz component of the linear force vector of the simulated aircraft includes the step of receiving and storing in the memory the signal representing the biased Gz component of the linear force vector of the simulated aircraft that is between substantially 1 G and the predetermined maximum G value;

wherein the step of receiving a signal representing a yaw gimbal position includes the step of receiving and storing in the memory the signal representing the yaw gimbal position;

wherein the step of computing a first angular motion for negating motion base-generated tangential G includes the step of computing the first angular motion for negating motion base-generated tangential G using the stored angular velocity of the arm and the stored yaw gimbal position;

wherein the step of computing a second angular motion for creating a motion base pilot perception of the pitch rate of the simulated aircraft includes the step of computing the second angular motion for creating the motion base pilot perception of the pitch rate of the simulated aircraft using the stored pitch rate of the simulated aircraft; and wherein the step of computing a third angular motion for creating a motion base pilot perception of the Gx component includes the step of computing the third angular motion for creating the motion base pilot perception of the Gx component using the stored Gx component and the stored biased Gz component.

20. A process for generating a total angular gimbal motion to control roll in a gimballed motion base system substantially duplicating pilot perceptions from an aircraft simulation, the gimballed motion base system including a plurality of gimbals and a processor, said process comprising the steps of:

receiving a signal representing a roll rate of the simulated aircraft;

receiving a signal representing a Gy component of a linear force vector of the simulated aircraft;

receiving a signal representing an angular velocity of an arm of the motion base system;

receiving a signal representing a biased Gz component of the linear force vector of the simulated aircraft that is between substantially 1 G and a predetermined maximum G value;

receiving a signal representing a yaw gimbal position;

computing a first angular motion for negating motion base-generated radial G using the angular velocity of the arm and the yaw gimbal position;

computing a second angular motion for creating a motion base pilot perception of the roll rate of the simulated aircraft using the roll rate of the simulated aircraft;

computing a third angular motion for creating a motion base pilot perception of the Gy component pertaining to roll using the Gy component and the biased Gz component;

computing a total angular gimbal motion using the first, second, and third angular gimbal motions; and sending a signal representing the computed total angular gimbal motion to the gimbals to set the total angular gimbal motion to the computed total angular gimbal motion.

21. The process of claim 20, wherein the step of receiving a yaw gimbal position includes the steps of: receiving a zero yaw gimbal position when a yaw gimbal is absent from the motion base system; and receiving a non-zero yaw gimbal position when the motion base system includes a yaw gimbal.

22. The process of claim 21, wherein the gimbals of the system are controlled by motors, wherein the step of computing the first angular motion of the roll gimbal for negating motion base-generated radial G using the angular velocity of the arm and the yaw gimbal position includes the step of computing a roll gimbal time delayed value to compensate for differences in arm and gimbal motor characteristics of the motion base system, and wherein the step of computing a total angular gimbal motion includes the step of delaying the total gimbal motion according to the time delayed value.

23. The process of claim 21, further including the step of:

computing an angular acceleration of the arm for negating motion base-generated tangential G using the angular velocity of the arm; and scaling the angular acceleration to create a scaled angular acceleration, and wherein the step of computing the total angular gimbal motion using the first, second, and third gimbal motions includes the step of:

computing the total angular gimbal motion using the first, second, and third gimbal motions and the scaled angular acceleration.

24. The process of claim 20, wherein the motion base system includes a memory, and wherein the step of receiving a signal representing a roll rate of the simulated aircraft includes the step of receiving and storing in the memory the signal representing the roll rate of the simulated aircraft;

wherein the step of receiving a signal representing a Gy component of a linear force vector of the simulated aircraft; includes the step of receiving and storing in the memory the signal representing the Gy component of the linear force vector of the simulated aircraft;

wherein the step of receiving a signal representing an angular velocity of an arm of the motion base system includes the step of receiving and storing in the memory the signal representing the angular velocity of the arm of the motion base system;

wherein the step of receiving a signal representing a biased Gz component of the linear force vector of the simulated aircraft includes the step of receiving and storing in the memory the signal representing the biased Gz component of the linear force vector of the simulated aircraft that is between substantially 1 G and the predetermined maximum G value;

wherein the step of receiving a signal representing a yaw gimbal position includes the step of receiving and storing in the memory the signal representing the yaw gimbal position;

wherein the step of computing a first angular motion for negating motion base-generated radial G includes the step of computing the first angular motion for negating motion base-generated radial G using the stored angular velocity of the arm and the stored yaw gimbal position;

wherein the step of computing a second angular motion for creating a motion base pilot perception of the roll rate of the simulated aircraft includes the step of computing the second angular motion for creating the motion base pilot perception of the roll rate of the simulated aircraft using the stored roll rate of the simulated aircraft;

wherein the step of computing a third angular motion for creating a motion base pilot perception of the Gy component pertaining to roll includes the step of computing the third angular motion for creating the motion base pilot perception of the Gy component pertaining to roll using the stored Gy component and the stored biased Gz component.

25. A process for generating an angular gimbal motion to negate pitch and roll artifacts in a gimballed motion base system having an arm and a plurality of gimbals, and substantially duplicating pilot perceptions from an aircraft simulation, the gimballed motion base system also including a processor, said process performed by the processor and comprising the steps of:
receiving a signal representing an angular velocity of the arm;
receiving a signal representing a biased Gz component of a linear force vector of the simulated aircraft that is between substantially 1 G and a predetermined maximum G value;
receiving a signal representing a yaw gimbal position;
computing an angular acceleration of the arm;
filtering the angular acceleration and angular velocity of the arm to compensate for differences in arm and gimbal characteristics, to produce a time delayed angular acceleration value and a time delayed angular velocity value, wherein the time delayed angular acceleration value and the time delayed angular velocity value are in-phase;
scaling the time delayed angular acceleration value to compensate for gains created during the angular acceleration computing step;
computing a radial G component using the time delayed angular velocity value and a radius of the arm;
computing a tangential G component using the scaled, time delayed angular acceleration value and the arm radius;
compensating for the limitations of the motion base system when a linear force of the simulated aircraft is less than a total G of the motion base system, wherein a total G of the motion base system is the vector sum of the tangential G, the radial G, and the G force of the earth's gravity;
compensating for the effects of the received yaw gimbal position;
computing at least one angular gimbal motion to negate the tangential and radial G components;
filtering the at least one angular gimbal motion to compensate for differences in gimbal motor characteristics;
computing at least one optimum gimbal motion for a gimbal of the motion base system from respective ones of the at least one filtered angular gimbal motions; and
sending a signal representing the computed optimum gimbal motion to a selected gimbal to set the angular gimbal motion of the selected gimbal to the computed optimum gimbal motion.

26. A process for generating a gimbal motion in a gimbal motion base system substantially duplicating pilot perceptions from an aircraft simulation, wherein the pilot of the simulated aircraft experiences a G force of less than one, and wherein a cockpit of the motion base system initially has a first position, said process comprising the steps of:
receiving a tangential G component of the motion base system;
receiving a radial G component of the motion base system;
receiving a total G of the simulated aircraft;
computing a total G value of the motion base system using the received radial G component, the received tangential G component, and the G of the earth's gravity;
computing a gimbal motion to move the cockpit to a second position when the total G of the simulated aircraft is less than the total G of the motion base; and
moving the cockpit according to the computed gimbal motion, when the total G of the simulated aircraft is less than the total G of the motion base.

27. The process of claim 26, wherein the motion base system has a roll gimbal and a pitch gimbal and wherein the step of computing the gimbal motion when the total G of the simulated aircraft is less than the total G of the motion base includes the steps of:
computing a roll gimbal motion when the motion base system is simulating a roll; and
computing a pitch gimbal motion when the motion base system is simulating a pitch.

28. The process of claim 26, further including the step of computing a transition gimbal motion to return the cockpit to the first position when the total G of the simulated aircraft is greater than the total G of the motion base.

29. The process of claim 26, wherein the first cockpit position is inboard.

30. The process of claim 26, wherein the second cockpit position is outboard.

31. The process of claim 26, wherein the step of computing a gimbal motion to move the cockpit to a second orientation when the total G of the simulated aircraft is less than the total G of the motion base includes the step of:
computing a second gimbal motion to compensate for the first gimbal motion.

32. The process of claim 25, wherein the motion base system includes a memory, and
wherein the step of receiving a signal representing an angular velocity of the arm includes the step of receiving and storing in the memory the signal representing the angular velocity of the arm;
wherein the step of receiving a signal representing a biased Gz component of a linear force vector of the simulated aircraft includes the step of receiving and storing in the memory the signal representing the biased Gz component of the linear force vector of the simulated aircraft that is between substantially 1 G and the predetermined maximum G value;
wherein the step of receiving a signal representing a yaw gimbal position includes the step of receiving and storing in the memory the signal representing the yaw gimbal position;

wherein the step of filtering the angular acceleration and angular velocity of the arm includes the step of filtering the stored angular acceleration and stored angular velocity of the arm to compensate for differences in arm and gimbal characteristics, to produce the time delayed angular acceleration value and the time delayed angular velocity value, wherein the time delayed angular acceleration value and the time delayed angular velocity value are in-phase; and wherein the step of compensating for the effects of the received yaw gimbal position includes the step of compensating for the effects of the received stored yaw gimbal position.

33. A process for generating angular gimbal motions to control pitch and roll in a motion base system having a cockpit, an arm, a pitch gimbal, a roll gimbal, and a yaw gimbal, and substantially duplicating a pilot perceptions from an aircraft simulation, said process comprising the step of:

defining a baseline pitch gimbal position and a baseline roll gimbal position according to a position of the yaw gimbal and an orientation of the cockpit; and accelerating the arm, thus wherein the pilot perception reflects the baseline pitch and roll gimbal positions.

34. The process of claim 33, wherein the step of generating a signal representing the baseline pitch gimbal position value includes the step of:

generating a signal representing the baseline pitch gimbal position value so that the pitch gimbal controls an effect of a tangential acceleration of the arm on the pilot according to a first cockpit orientation and a first yaw gimbal position; and wherein the step of generating a signal representing the baseline roll gimbal position value includes the step of:

generating a signal representing the baseline roll gimbal position value so that the roll gimbal controls an effect of a radial acceleration of the arm on the pilot according to the first cockpit orientation and the first yaw gimbal position.

35. The process of claim 33, wherein the step of generating a signal representing the baseline pitch gimbal position value includes the step of:

generating a signal representing the baseline pitch gimbal position value so that the pitch gimbal controls an effect of a radial acceleration of the arm on the pilot according to a first cockpit orientation and a second yaw gimbal position; and wherein the step of generating a signal representing the baseline roll gimbal position value includes the step of:

generating a signal representing the baseline roll gimbal position value so that the roll gimbal controls an effect of a tangential acceleration of the arm on the pilot according to the first cockpit orientation and the second yaw gimbal position.

36. The process of claim 33, wherein the step of generating a signal representing the baseline pitch gimbal position value includes the step of:

generating a signal representing the baseline pitch gimbal position value so that the pitch gimbal controls an effect of a tangential acceleration of the arm on the pilot according to a second cockpit orientation and a second yaw gimbal position; and wherein the step of generating a signal representing the baseline roll gimbal position value includes the step of:

generating a signal representing the baseline roll gimbal position value so that the roll gimbal controls an effect of a radial acceleration of the arm on the pilot according to the second cockpit orientation and the second yaw gimbal position.

37. The process of claim 33, wherein the step of generating a signal representing the baseline pitch gimbal position value includes the step of:

generating a signal representing the baseline pitch gimbal position value so that the pitch gimbal controls an effect of a radial acceleration of the arm on the pilot according to a second cockpit orientation and a first yaw gimbal position; and wherein the step of generating a signal representing the baseline roll gimbal position value includes the step of:

generating a signal representing the baseline roll gimbal position value so that the roll gimbal controls an effect of a tangential acceleration of the arm on the pilot according to the second cockpit orientation and the first yaw gimbal position.

38. The process of claim 33, wherein the step of generating a signal representing the baseline pitch gimbal position value includes the step of:

generating a signal representing the baseline pitch gimbal position value so that the pitch gimbal controls an effect of the first portion of a radial acceleration of the arm on the pilot and an effect of a first portion of a tangential acceleration of the arm on the pilot according to a third yaw gimbal position; and wherein the step of generating a signal representing the baseline roll gimbal position value includes the step of:

generating a signal representing the baseline roll gimbal position value so that the roll gimbals controls an effect of a second portion of the radial acceleration of the arm on the pilot and an effect of a second portion of a tangential acceleration of the arm on the pilot according to a third yaw gimbal position.

39. The process of claim 33, wherein the motion base system includes a memory, and further including the steps of:

storing the signal representing the baseline pitch gimbal position value in the memory; and storing the signal representing the baseline roll gimbal position value in the memory.

40. A process for generating angular gimbal motions to negate radial and tangential G artifacts in a gimballed motion base system wherein a gimbal is controlled by a gimbal motor, and substantially duplicating pilot perceptions from an aircraft simulation, the gimballed motion base system including a processor, said process performed by the processor and comprising the steps of:

computing a first angular gimbal motion negating the tangential G artifacts of the motion base;

computing a second angular gimbal motion negating the radial G artifacts of the motion base;

optimizing the computed gimbal motions according to a predetermined inverted transfer function using the first and second angular gimbal motions; and sending a signal to the gimbal to control the motions of the gimbal to be the optimized gimbal motions.

41. The process of claim 40, wherein the gimbal motors have differences in operating characteristics, and further comprising the step of:
  filtering the first and second angular gimbal motions to compensate for the differences in the operating characteristics of the gimbal motors, and
  wherein the optimizing step optimizes the filtered angular gimbal motions.

42. The process of claim 40, wherein the motion base system includes a memory, and further including the steps of:
  storing the computed first angular gimbal motion in the memory; and
  storing the computed second angular gimbal motion in the memory, and
  wherein the step of optimizing the computed gimbal motions according to a predetermined inverted transfer function includes the step of optimizing the computed gimbal motions according to the predetermined inverted transfer function using the stored first and second angular gimbal motions.

43. A process for generating angular gimbal motions to control pitch and roll in a gimballed motion base system having a cockpit capable of assuming varying orientations, and substantially duplicating pilot perceptions from an aircraft simulation, said process comprising the steps of:
  computing an angular gimbal motion for a first gimbal to control pilot pitch perception when the cockpit has a first orientation;
  computing an angular gimbal motion for a second gimbal to control pilot roll perception when the cockpit has said first orientation;
  computing an angular gimbal motion for the first gimbal to control pilot roll perception when the cockpit has a second orientation;
  computing an angular gimbal motion for the second gimbal to control pilot pitch perception when the cockpit has said second orientation;
  controlling the first gimbal according to the computed angular gimbal motion to control pilot pitch perception when the cockpit has said first orientation, and according to the computed angular gimbal motion to control pilot roll perception when the cockpit has said second orientation; and
  controlling the second gimbal according to the computed angular gimbal motion to control pilot roll perception when the cockpit has said first orientation, and according to the computed angular gimbal motion to control pilot pitch perception when the cockpit has said second orientation.

44. The process of claim 43, wherein said first orientation is one of an inboard and an outboard orientation.

45. The process of claim 43, wherein said second orientation is a tangential orientation.

46. A process for generating an angular gimbal motion to control yaw perception in a gimballed motion base system having a yaw gimbal, and substantially duplicating pilot perceptions from an aircraft simulation, the gimballed motion base system including a processor, said process performed by the processor and comprising the steps of:
  receiving a signal representing a Gy component of a linear force vector of the simulated aircraft;
  receiving a signal representing a Gx component of a linear force vector of the simulated aircraft;
  receiving a signal representing a yaw rate of the simulated aircraft;
  receiving a signal representing a biased Gz component of a linear force vector of the motion base;
  computing an angular motion of the yaw gimbal from the Gy component, the Gx component, the yaw rate, and the biased Gz component; and
  sending a signal to the yaw gimbal to control the angular motion of the yaw gimbal to be the computed angular motion.

47. The process of claim 46, wherein the motion base system has a cockpit capable of assuming varying orientations, said process further including the steps of:
  receiving a cockpit orientation indication; and
  biasing the yaw gimbal position based on the cockpit orientation indication.

48. The process of claim 46, wherein the motion base system includes a memory, and
  wherein the step of receiving a signal representing a Gy component of a linear force vector of the simulated aircraft includes the step of receiving and storing in the memory the signal representing the Gy component of the linear force vector of the simulated aircraft;
  wherein the step of receiving a signal representing a Gx component of a linear force vector of the simulated aircraft includes the step of receiving and storing in the memory the signal representing the Gx component of the linear force vector of the simulated aircraft;
  wherein the step of receiving a signal representing a yaw rate of the simulated aircraft includes the step of receiving and storing in the memory the signal representing the yaw rate of the simulated aircraft;
  wherein the step of receiving a signal representing a biased Gz component of a linear force vector of the motion base includes the step of receiving and storing in the memory the signal representing the biased Gz component of the linear force vector of the motion base; and
  wherein the step of computing an angular motion of the yaw gimbal includes the step of computing the angular motion of the yaw gimbal from the stored Gy component, the stored Gx component, the stored yaw rate, and the stored biased Gz component.

49. A process for comparing perceived roll, pitch, and yaw in a motion base system with perceived roll, pitch, and yaw in a simulated aircraft, said process comprising:
  receiving a first linear force vector and a first angular velocity of the simulated aircraft;
  computing, responsive to the first linear force vector and the first angular velocity of the simulated aircraft, the perceived roll, the perceived pitch, and the perceived yaw predicted for a pilot in the simulated aircraft according to a predetermined perceptual model;
  controlling the motion base system, according to the first linear force vector, the first angular velocity, and predetermined control parameters, to move a cockpit of the motion base system according to a second linear force vector at a second angular velocity;
  sensing the second linear force vector and the second angular velocity of the controlled motion base system;
  computing, responsive to the second linear force vector and the second angular velocity of the controlled motion base system, the perceived roll, the perceived pitch, and the perceived yaw predicted for a pilot in the cockpit of the motion base system according to the predetermined perceptual model, wherein said same predetermined perceptual model is used in both computing steps;

comparing the perceived roll predicted for a pilot in the simulated aircraft and the perceived roll predicted for a pilot in the motion base system to produce a first comparison value;

comparing the perceived pitch predicted for a pilot in the simulated aircraft and the perceived pitch predicted for a pilot in the motion base to produce a second comparison value;

comparing the perceived yaw predicted for a pilot in the simulated aircraft and the perceived yaw predicted for a pilot in the motion base to produce a third comparison value; and altering the control parameters of the motion base system controlling step to reflect the first, second, and third comparison values.

50. The process of claim 49,
wherein the motion base system has a yaw gimbal, and
wherein the motion base system controlling step further includes the step of controlling the yaw gimbal according to the first linear force vector, the first angular velocity, and the predetermined control parameters.

51. The process of claim 49 wherein, in each comparing step, the perceived value for a pilot in the motion base system and the perceived value for a pilot in the simulated aircraft are substantially equal.

52. The process of claim 49, further including the step of iteratively performing the receiving step, both computing steps, the controlling step, the sensing step, each comparing step, and the altering step until the first, second, and third comparison values are substantially equal to zero.

53. The process of claim 49, wherein the first and second angular velocities includes respective pitch, roll, and yaw rates and wherein the first and second linear force vectors include respective Gx, Gy, and Gz components.

54. The process of claim 53, wherein the step of computing perceived pitch predicted for a pilot in the motion base system according to the predetermined perceptual model includes the steps of:
receiving the Gx and Gz components of the motion base system;
receiving the pitch rate of the motion base system;
filtering the Gz component;
computing an angular component of the perceived pitch;
scaling the angular component of the perceived pitch according to the filtered Gz component;
computing a vector component of the perceived pitch; and
adding the scaled angular component of the perceived pitch and the vector component of the perceived pitch to produce the perceived pitch.

55. The process of claim 53, wherein the step of computing the perceived pitch predicted for a pilot in the simulated aircraft according to the predetermined perceptual model includes the steps of:
receiving the Gx and Gz components of the simulated aircraft;
receiving the pitch rate of the simulated aircraft
filtering the Gz component;
computing an angular component of the perceived pitch;
scaling the angular component of the perceived pitch according to the filtered Gz component;
computing a vector component of the perceived pitch; and
adding the scaled angular component of the perceived pitch and the vector component of the perceived pitch to produce the perceived pitch.

56. The process of claim 53, wherein the step of computing the perceived roll predicted for a pilot in the motion base system according to the predetermined perceptual model includes the steps of:
receiving the Gx, Gy, and Gz components of the motion base system;
receiving the roll rate of the motion base system
computing an angular component of the perceived roll;
filtering the Gz component;
scaling the angular component of the perceived roll according to the filtered Gz component;
determining a portion of the Gy component pertaining to roll;
computing a vector component of the perceived roll from the portion of the Gy component pertaining to roll; and
adding the scaled angular component of the perceived roll and the vector component of the perceived roll to produce the perceived roll.

57. The process of claim 53, wherein the step of computing the perceived roll predicted for a pilot in the simulated aircraft according to the predetermined perceptual model includes the steps of:
receiving the Gx, Gy, and Gz components of the simulated aircraft;
receiving the roll rate of the simulated aircraft;
computing an angular component of the perceived roll;
filtering the Gz component;
scaling the angular component of the perceived roll according to the filtered Gz component;
determining a portion of the Gy component pertaining to roll;
computing a vector component of the perceived roll from the portion of the Gy component pertaining to roll; and
adding the scaled angular component of the perceived roll and the vector component of the perceived roll to produce the perceived roll.

58. The process of claim 53, wherein the step of computing the perceived yaw predicted for a pilot in the motion base system according to the predetermined perceptual model includes the steps of:
receiving the Gx, Gy, and Gz components of the motion base system
receiving the yaw rate of the motion base system;
computing an angular component of the perceived yaw;
determining a portion of the Gy component pertaining to yaw;
computing a vector component of the perceived yaw according to the portion of the Gy component pertaining to yaw; and
adding the angular component of the perceived yaw and the vector component of the perceived roll to produce the perceived yaw.

59. The process of claim 53, wherein the step of computing the perceived yaw predicted for a pilot in the simulated aircraft according to the predetermined perceptual model includes the steps of:
receiving the Gx, Gy, and Gz components of the simulated aircraft;
receiving the yaw rate of the simulated aircraft;
computing an angular component of the perceived yaw;
determining a portion of the Gy component pertaining to yaw;
computing a vector component of the perceived yaw according to the portion of the Gy component pertaining to yaw; and
adding the angular component of the perceived yaw and the vector component of the perceived roll to produce the perceived yaw.

* * * * *